(12) United States Patent
Arakawa

(10) Patent No.: US 8,666,187 B2
(45) Date of Patent: Mar. 4, 2014

(54) IMAGE REPRODUCTION APPARATUS AND IMAGE REPRODUCTION METHOD

(75) Inventor: Kenji Arakawa, Kyoto (JP)

(73) Assignee: Panasonic Corporation, Osaka (JP)

(*) Notice: Subject to any disclaimer, the term of this patent is extended or adjusted under 35 U.S.C. 154(b) by 126 days.

(21) Appl. No.: 13/274,578

(22) Filed: Oct. 17, 2011

(65) Prior Publication Data

US 2012/0033893 A1 Feb. 9, 2012

Related U.S. Application Data

(63) Continuation of application No. PCT/JP2009/006669, filed on Dec. 7, 2009.

(30) Foreign Application Priority Data

Apr. 22, 2009 (JP) .................................. 2009-104477

(51) Int. Cl.
*G06K 9/00* (2006.01)

(52) U.S. Cl.
USPC ........................................... 382/252; 382/275

(58) Field of Classification Search
USPC ................................................. 382/252, 275
See application file for complete search history.

(56) References Cited

U.S. PATENT DOCUMENTS

| | | | |
|---|---|---|---|
| 6,757,332 B1 * | 6/2004 | Kadono | 375/240.25 |
| 6,999,673 B1 | 2/2006 | Kadono | |
| 2002/0196853 A1 * | 12/2002 | Liang et al. | 375/240.16 |
| 2004/0146209 A1 * | 7/2004 | Kadowaki et al. | 382/233 |
| 2006/0078056 A1 * | 4/2006 | Kadono | 375/240.27 |
| 2006/0152605 A1 | 7/2006 | Okazaki | |
| 2007/0217519 A1 * | 9/2007 | Murayama et al. | 375/240.25 |
| 2008/0069466 A1 * | 3/2008 | Lee et al. | 382/252 |

FOREIGN PATENT DOCUMENTS

| | | |
|---|---|---|
| JP | 08-070432 | 3/1996 |
| JP | 10-174094 | 6/1998 |
| JP | 2001-169282 | 6/2001 |
| JP | 2005-333437 | 12/2005 |
| JP | 2006-174280 | 6/2006 |
| JP | 2006-196959 | 7/2006 |
| JP | 2006-345046 | 12/2006 |

OTHER PUBLICATIONS

International Search Report and Written Opinion for PCT/JP2009/006669, dated Jan. 12, 2010 along with an english translation of ISR.

* cited by examiner

*Primary Examiner* — Jingge Wu
(74) *Attorney, Agent, or Firm* — McDermott Will & Emery LLP

(57) ABSTRACT

An image reproduction apparatus decompresses and outputs compressed data, and includes: a reproduction unit which reads, per predetermined unit of processing, the compressed data as unit compressed data from a recording medium; a decompression unit which decompresses the unit compressed data, so as to generate unit decompressed data; a display processing unit which outputs decompressed data including the unit decompressed data; an error management unit which detects, per unit compressed data, an error caused in either the reproduction unit or the decompression unit; and a control unit which determines whether or not to output the decompressed data when the error is detected, and when it is determined to output the decompressed data, the control unit complements, with implement image data, unit decompressed data corresponding to the unit compressed data in which the error has been detected, and the display processing unit outputs decompressed data including the complement image data.

4 Claims, 18 Drawing Sheets

IMAGE REPRODUCTION APPARATUS AND IMAGE REPRODUCTION METHOD

CROSS REFERENCE TO RELATED APPLICATION

This is a continuation application of PCT application No. PCT/JP2009/006669 filed on Dec. 7, 2009, designating the United States of America.

BACKGROUND OF THE INVENTION (1) Field of the Invention

The present invention relates to image reproduction apparatuses and image reproduction methods, and relates particularly to an image reproduction apparatus and an image reproduction method for reading compressed image data from a recording medium and decompressing the image data that is read.

(2) Description of the Related Art

Conventionally, image data is compression-coded based on coding schemes such as Joint Photographic Coding Experts Group (JPEG) and Moving Picture Experts Group (MPEG) and recorded on a recording medium or the like. Japanese Unexamined Patent Publication Application No. H8-070432 (Patent Reference 1), for example, discloses a method of partially reading and decompressing a necessary part of coded data (hereinafter, also described as compressed data) recorded on the recording medium.

The technique disclosed in Patent Reference 1 detects an RST marker from the compressed data including a restart marker code (hereinafter, also described as an RST marker) and decompresses the compressed data based on a position of the detected RST marker as a start point for the decompression. With this, the technique disclosed in Patent Reference 1 allows decompressing the compressed data only partially, thus allowing processing of necessary data at higher speed.

Note that the RST marker is a code indicating a position for restoring the decompression processing in a case such as occurrence of an error in the decompression processing and so on. Patent Reference 2, for example, shows a technique for such restore processing using the RST marker.

The technique disclosed in Japanese Unexamined Patent Publication Application No. 2006-345046 (Patent Reference 2) detects the RST marker when an error occurs, and decompresses the compressed data located after the detected RST marker. Furthermore, the point at which the error has occurred is complemented with predetermined dummy image data. This enhances image reconstruction performance of the technique disclosed in Patent Reference 2.

SUMMARY OF THE INVENTION

However, the conventional techniques described above have a problem of insufficient processing in the case of error occurrence.

Errors, for example, include: a coding error which occurs when the coded data itself recorded on the recording medium has an error, and a transfer error which occurs when the coded data is read from the recording medium. The conventional techniques described above, regardless of the type of the error, simply decompress the coded data starting from the next RST marker and output the decompressed data when the error occurs.

In other words, the conventional techniques above are fixed in terms of processing of the generated decompressed data and therefore do not achieve flexible processing.

Thus, an object of the present invention is to provide an image reproduction apparatus and an image reproduction method which allow flexible control of the processing of the decompressed data that is obtained when an error occurs, so as to deal with the error that has occurred.

To solve the above problem, the image reproduction apparatus according to an aspect of the present invention is an image reproduction apparatus which decompresses compressed data that is compressed image data and outputs the decompressed data, and the image reproduction apparatus includes: a reproduction unit which reads, per unit of processing, the compressed data as unit compressed data from a recording medium, the unit of processing being predetermined; a decompression unit which decompresses the unit compressed data read by the reproduction unit, so as to generate unit decompressed data that is image data in each unit of processing; an output unit which outputs decompressed data including the unit decompressed data generated by the decompression unit; an error management unit which detects, for each unit compressed data, an error caused in at least one of the reproduction unit and the decompression unit; and a control unit which determines whether or not the decompressed data is to be output when the error is detected, and when the control unit determines that the decompressed data is to be output when the error is detected, the control unit complements, with complement image data that is predetermined, unit decompressed data corresponding to the unit compressed data in which the error is detected, and the output unit outputs the decompressed data including the complement image data.

This allows the user to recognize the image data as much as possible, through output of image data when it is determined to output the image data even in case of error occurrence. Thus, compared to the case of not displaying the image data at all, this allows the user to recognize what the image data intended to be reproduced is like. In contrast, since no image data is output when it is determined that the image data is not to be output in case of an error, the user need not recognize incomplete image data resulting from the error occurrence and thus is able to recognize only normal image data. Thus, by adaptively changing the processing in the case of error occurrence, it is possible to flexibly control the processing of the image data when the error is detected and deal with the error that has occurred.

In addition, the image reproduction apparatus may further include an input unit which receives a first user instruction indicating whether or not the decompressed data is to be output when the error is detected, and the control unit may determine, according to the first user instruction, whether or not the decompressed data is to be output when the error is detected.

With this, the input unit for receiving an instruction from the user is included, thus allowing reflecting the user's intention in the processing performed in the case of error occurrence.

In addition, the image reproduction apparatus may further include a data buffer management unit which includes at least one buffer and stores, into the at least one buffer, the unit compressed data that is read by the reproduction unit, and the reproduction unit may forward, to the data buffer management unit, the unit compressed data read from the recording medium, the decompression unit may read the unit compressed data stored in the at least one buffer, and may decompress the unit compressed data that is read, so as to generate the unit decompressed data, and the error management unit may include: a transfer error management unit which detects a transfer error which occurs in transferring the unit compressed data from the recording medium to the data buffer management unit; and a coding error management unit which detects a coding error in the unit compressed data read from the at least one buffer by the decompression unit.

With this, it is determined whether the error has occurred during transfer of the unit compressed data from the recording medium to the buffer (transfer error), or whether the error has occurred in the unit compressed data that is read (coding error), or whether both of these errors have occurred, thus allowing appropriate processing according to the type of the error that has occurred.

In addition, the reproduction unit may re-read same unit compressed data from the recording medium when the transfer error management unit detects the transfer error, the same unit compressed data being compressed data that is included in a same unit of processing as the unit compressed data in which the transfer error has been detected.

With this, when performing a retransfer in case of occurrence of the transfer error, it becomes possible to retransfer the same unit compressed data, thus increasing the possibility of enabling normal transfer of the unit compressed data without occurrence of the transfer error.

In addition, when detecting the transfer error, the transfer error management unit may count the number of transfer errors, compare the counted number with a predetermined threshold, and notify the control unit of a result of the comparison, the control unit may cause, based on the result of the comparison, the reproduction unit to repeat re-reading of the same unit compressed data until the counted number exceeds the threshold, and the control unit may complement, with the complement image data, unit decompressed data corresponding to the unit compressed data in which the error has been detected, in the case where it is determined that the compressed data is to be output when the error is detected and where the counted number exceeds the threshold or the coding error is detected by the coding error management unit.

With this, by previously determining the number of retransfers to be performed (threshold), it is possible to prevent endless repetition of the retransfer.

In addition, the input unit may further obtain a second user instruction indicating the threshold, and the control unit may cause the reproduction unit to repeat the re-reading of the same unit compressed data until the counted number exceeds the threshold indicated by the second user instruction.

With this, the user is able to set the number of retransfers.

In addition, the reproduction unit may read the unit compressed data from the recording medium through access to the recording medium at a first access frequency, and may read the same unit compressed data, when the transfer error management unit detects the transfer error in the unit compressed data, through access to the recording medium at a second access frequency that is lower than the first access frequency.

With this, in the retransfer, it is possible to decrease the access frequency to the recording medium, thus increasing the possibility of enabling normal transfer of the unit compressed data.

In addition, the control unit may generate defective-recording-medium image data which indicates that the recording medium has a defect, in the case where errors occur in at least two pieces of unit compressed data included in the compressed data representing one frame or where an error occurs in compressed data indicating at least two frames, and the output unit may output the defective-recording-medium image data.

With this, it is possible to present the defect of the recording medium itself to the user.

In addition, when determining that the decompressed data is to be output when the error is detected, the control unit may complement the unit decompressed data corresponding to the unit compressed data in which the error has been detected, using image data in a single color or image data around an image region corresponding to the unit decompressed data.

With this, it is possible to complement, with other image data, the image region that is missing due to occurrence of the error, thus allowing output of image data that is closest possible to the normal data. For example, it is possible to output the image data that is the closest possible to the normal image data by generating a predictive image for the missing image region, using image data around the missing image region.

In addition, the input unit may receive a third user instruction which indicates whether or not decompression is to be performed, when the error is detected, on unit compressed data located after the unit compressed data in which the error has been detected, and the control unit may determine, according to the third user instruction, whether or not decompression is to be performed, when the error is detected, on the unit compressed data located after the unit compressed data in which the error has been detected.

With this, it is possible to determine whether or not to continue decompression processing in case of error occurrence, thus allowing recognizing as much decompressed image data as possible in the case of continuing the decompression processing, compared to the case of suspending the decompression processing.

In addition, the compressed data may include an application marker segment, and the decompression unit may further detect the application marker segment, and may decompress unit compressed data, when the application marker segment is detected in unit compressed data included in the detected application marker segment, starting from unit compressed data that is not included in the application marker segment.

With this it is possible to decompress image data that is not included in the application marker segment (hereinafter, described as an APP marker), thus allowing generation of the image data that is to be output. This is because the APP marker is data added to the data of the image itself, thus allowing decompression of the data of the image itself even in the case where an error occurs in the unit compressed data included in the APP marker.

In addition, the compressed data may include a restart marker code, and the decompression unit may further detect the restart marker code, and may decompress, when the error is detected, compressed data located after the restart marker code that is included after the compressed data in the unit of processing in which the error has been detected.

With this, it is possible to decompress the compressed data after the RST marker, thus reducing the image area that is missing due to the error.

In addition, the control unit may predetermine specific image data that is to be used for complementing, when specific data that is predetermined is detected, image data located after the detected specific data, and the decompression unit may further detect the specific data, and complement, with the specific image data predetermined by the control unit, image data located after the detected specific data when the specific data is detected in a Huffman code region in the compressed data.

With this, it is possible to detect the specific data embedded in the compressed data and replace the detected specific data with the specific image data, thus allowing the user to recognize the image data that is decompressed if only partially.

In addition, the image reproduction apparatus may further include: a storage unit; an image capturing unit which captures, at a first frame rate, video data composed of a plurality of frames, and store the video data in the storage unit; a compression unit which reads the video data stored in the storage unit, and generates the compressed data by compressing the read video data at a second frame rate; and a recording unit which records, onto the recording medium, the compressed data generated by the compression unit, and the control unit may further compare the first frame rate and the second frame rate, and may cause, when the first frame rate is higher than the second frame rate, the compression unit to suspend compression processing that is being performed by the compression unit on the image data of a predetermined frame, and the compression unit may embed the specific data in the Huffman code region when the control unit suspends the compression processing.

With this, since compression processing cannot be timely performed when a frame rate for obtaining the video data is higher than the frame rate for compressing the obtained video data, it is possible to compress as much image data as possible by firstly performing compression processing on image data of one frame and then embedding the specific data in the compressed image data. Thus, compared to the case of not compressing the image data of one frame, this allows the user to recognize the obtained image data if only partially.

In addition, the image reproduction apparatus may further include a display unit which displays decompressed data that is output by the output unit.

Note that the present invention can be realized not only as an image reproduction apparatus but also as a method including, as steps, processing units included in the image reproduction apparatus.

According to the present invention, it is possible to flexibly control processing of decompressed data that is obtained when an error occurs, and deal with the error that has occurred.

FURTHER INFORMATION ABOUT TECHNICAL BACKGROUND TO THIS APPLICATION

The disclosure of Japanese Patent Application No. 2009-104477 filed on Apr. 22, 2009 including specification, drawings and claims is incorporated herein by reference in its entirety.

The disclosure of PCT application No. PCT/JP2009/006669 filed on Dec. 7, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Hereinafter, embodiments of the present invention will be described with reference to the drawings.

First Embodiment

An image reproduction apparatus according to a first embodiment of the present invention is an image reproduction apparatus which reads, per predetermined unit of processing, compressed image data recorded on a recording medium, and decompresses and outputs the compressed image data that is read. The image reproduction apparatus according to the first embodiment has a feature of judging whether or not an error has occurred in the compressed data that is read, and determining whether or not to output, when an error occurs, the image data of an image that is partially missing due to the error. The following describes, first, a configuration of the image reproduction apparatus 100 according to the first embodiment with reference to FIG. 1.

Figure 1:
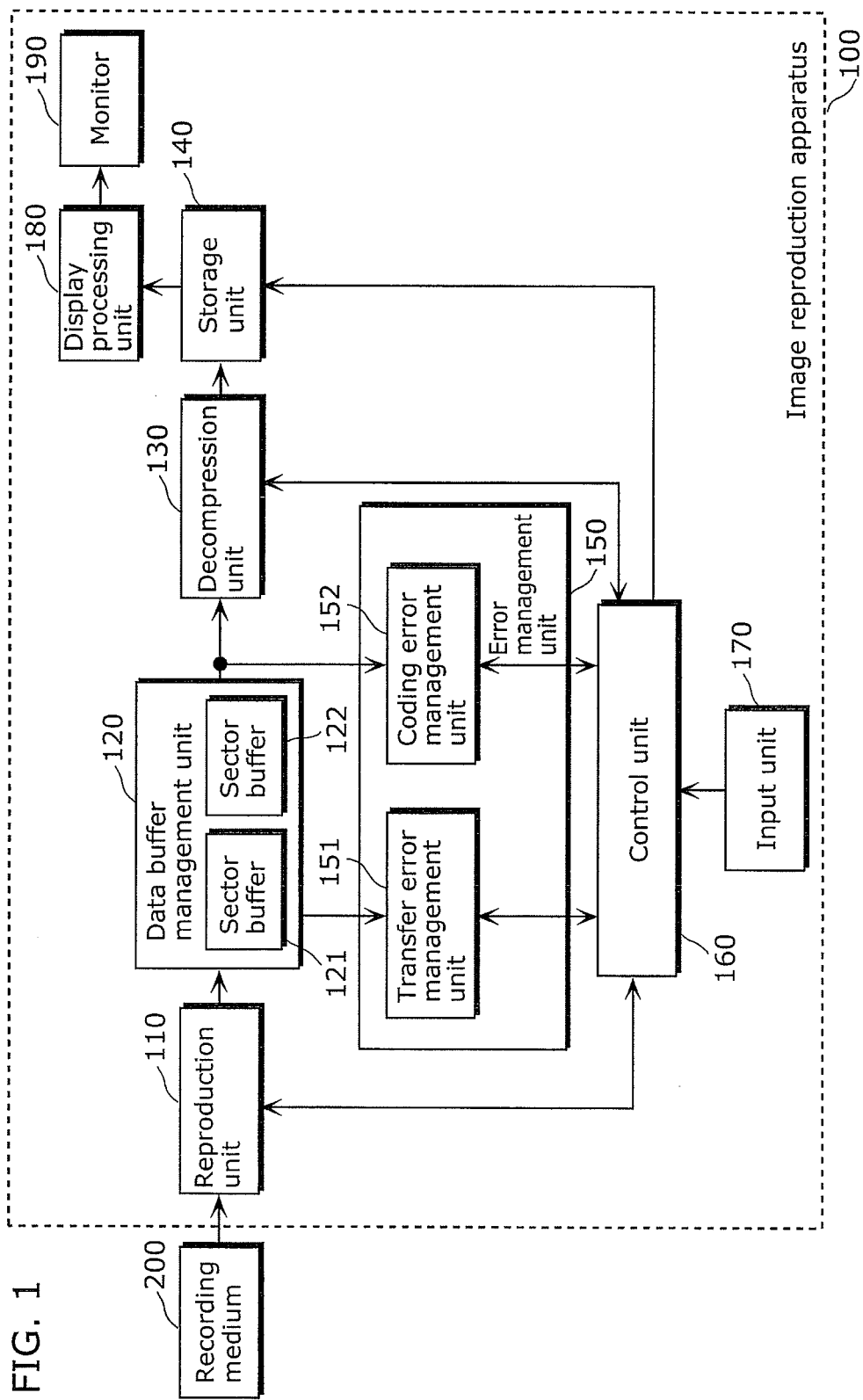
FIG. 1 is a block diagram showing a configuration of an image reproduction apparatus according to a first embodiment of the present invention.

FIG. 1 is a block diagram showing an example configuration of an image reproduction apparatus 100 according to the first embodiment.

As shown in FIG. 1, the image reproduction apparatus 100 includes: a reproduction unit 110, a data buffer management unit 120; a decompression unit 130; a storage unit 140, an error management unit 150, a control unit 160, an input unit 170, a display processing unit 180, and a monitor 190. The image reproduction apparatus 100 reads compressed data from a recording medium 200 such as a Secure Digital (SD) card and a hard disk drive (HDD), and displays on the monitor 190 an image generated by decompressing the compressed data that is read. Note that the recording medium 200 holds compressed data that is generated by compressing image data in accordance with coding schemes such as JPEG or MPEG.

The reproduction unit 110 is a reading unit which reads, per predetermined unit of processing, the compressed data as compressed unit data from the recording medium 200. For example, the reproduction unit 110 reads the compressed data per sector that is a minimum unit of reading from the recording medium 200, and transfers, to the data buffer management unit 120, the compressed data that is read per sector. In the reading, when an error related to transfer processing occurs, the reproduction unit 110 re-reads same unit compressed data that is compressed data included in the same unit of processing as the unit compressed data in which the error has occurred.

In addition, the reproduction unit 110 reads compressed data through access to the recording medium at a predetermined access frequency. Note that the reproduction unit 110 is capable of changing the access frequency according to the control from the control unit 160. For example, the reproduction unit 110 normally reads the unit compressed data through access to the recording medium 200 at a first access frequency, and reads, when re-reading, the same unit compressed data through access to the recording medium 200 at a second access frequency that is lower than the first access frequency.

The data buffer management unit 120 includes at least one data buffer and stores, in the data buffer, the unit compressed data read by the reproduction unit 110. In the first embodiment, as shown in FIG. 1, the data buffer management unit 120 includes two sector buffers 121 and 122, and stores the compressed data transferred from the reproduction unit 110, per sector, alternately into the sector buffers 121 and 122.

Note that each of the sector buffers 121 and 122 is a storage unit which can store the compressed data having a data amount of at least one sector. In addition, the data buffer management unit 120 may have three or more sector buffers. In addition, the sector buffers 121 and 122 may be buffer memories physically different from each other, or may be physically one buffer memory that is logically segmented.

The decompression unit 130 decompresses the unit compressed data that is read by the reproduction unit 110, so as to generate unit decompressed data that is decompressed image data per unit of processing as described above. Specifically, the decompression unit 130 reads, per sector, the compressed data stored in the sector buffers 121 and 122, and decompresses the compressed data that is read per sector. Then, the decompression unit 130 stores, in the storage unit 140, the decompressed data per sector, which is generated by decompressing the compressed data per sector.

The storage unit 140 is a memory or the like for recording the decompressed data. The storage unit 140 can hold image data of at least one frame. Thus, the storage unit 140 stores the decompressed data that is image data of one frame, by accumulating the unit decompressed data generated by the decompression unit 130.

The error management unit 150 detects, for each unit compressed data, an error caused in at least one of the reproduction unit 110 and the decompression unit 130. Specifically, the error management unit 150 judges, per sector, whether or not the error has occurred during the processing performed by each of the reproduction unit 110 and the decompression unit 130. When judging that an error has occurred, the error management unit 150 notifies the control unit 160 that the error has been detected. For a specific configuration, as shown in FIG. 1, the error management unit 150 includes a transfer error management unit 151 and a coding error management unit 152.

The transfer error management unit 151 detects a transfer error that occurs during the transfer of the unit compressed data from the recording medium 200 to the data buffer management unit 120. More specifically, the transfer error management unit 151 detects the transfer error that occurs during the transfer by the reproduction unit 110. For example, the transfer error management unit 151 judges whether or not the transfer error has occurred, using an error correction code (ECC) and so on.

In addition, the transfer error management unit 151 counts a transfer error number that is the number of detected transfer errors. Furthermore, the transfer error management unit 151 compares, with a predetermined threshold, the transfer error number that is counted, and notifies the control unit 160 of a result of the comparison. In other words, the transfer error management unit 151 judges whether or not the transfer error number is above the threshold, and notifies the control unit 160 of a result of the judgment. Note that the threshold in this context is the number of times that is determined by the control unit 160, and is, for example, a specific number that is a predetermined default number of times, or a user specified number indicated by a user instruction that is provided through the input unit 170.

The coding error management unit 152 detects a coding error in the unit compressed data that is read from the sector buffers 121 and 122 by the decompression unit 130. For example, the coding error management unit 152 detects a coding error when a header or data that is not supposed to appear (for example, FFFF) is included in a Huffman code region which represents the data of the image itself included in the compressed data.

The control unit 160 controls processing of the entire image reproduction apparatus 100 by providing an instruction to each processing unit included in the image reproduction apparatus 100. For example, the control unit 160 notifies each processing unit of the user instruction obtained through the input unit 170. Details of a specific instruction will be described later with reference to FIGS. 2 to 6.

In addition, the control unit 160 determines whether or not the decompressed data is to be displayed on the monitor 190 when the error management unit 150 detects an error (transfer error or coding error). When determining that the decompressed data is to be displayed on the monitor 190, the control unit 160 complements, with predetermined complement image data, unit decompressed data corresponding to the unit compressed data in which the error has been detected. Note that hereinafter, displaying data means displaying an image represented by the data.

Specifically, the control unit 160 complements, with the complement image data, an image region that is missing due to an error. The complement image data includes, for example, image data around the missing image region, other image data, or image data having a particular single color. When determining that the decompressed data is not to be displayed on the monitor 190, the control unit 160 generates decompression-disable display image data, and causes the monitor 190 to display the decompression-disable display image data.

In addition, the control unit 160 determines whether or not the recording medium is in a satisfactory condition or has a defect, according to the number of errors that have occurred and a point at which each error has occurred. Specifically, in the case where errors occur in at least two different pieces of unit compressed data included in the compressed data representing one frame or where an error occurs in compressed data representing at least two different frames, the control unit 160 generates defective-recording-medium image data which indicates that the recording medium has a defect.

The input unit 170 is a user interface through which the user instruction is obtained from the user, and through which the obtained user instruction is transmitted to the control unit 160. For example, the input unit 170 receives instructions such as: a first user instruction indicating whether or not the image data generated by decompressing the compressed data is to be output when the error is detected; a second user instruction indicating the threshold, that is, a specified number of retransfers (retry number) when the transfer error is detected; and, upon detection of the error, a third user instruction indicating whether or not to decompress the compressed data located after a point at which the error has been detected.

The display processing unit 180 is an example of an output unit which outputs decompressed data including the unit decompressed data generated by the decompression unit 130. Specifically, as shown in FIG. 1, the display processing unit 180 reads image data from the storage unit 140 and causes the monitor 190 to display the image data.

The monitor 190 is a display unit for displaying image data, such as a liquid crystal display (LCD), an organic electroluminescence (EL) display, a cathode-ray tube (CRT) display, and a plasma display panel (PDP).

With the configuration described above, the image reproduction apparatus 100 according to the first embodiment determines whether or not the image data that is partially missing due to an error is to be displayed on the monitor 190 even in case of occurrence of an error, and when it is determined to display the image data, the image reproduction apparatus 100 complements the image region that is missing due to the error and displays the complemented image. Since the determination in this context can be made by the user via the input unit 170, it is possible to reflect the user's intention when dealing with the error that occurs.

Subsequently, the operation of the image reproduction apparatus 100 according to the first embodiment is described, based on an example of a pattern in which the error occurs.

Figure 2:
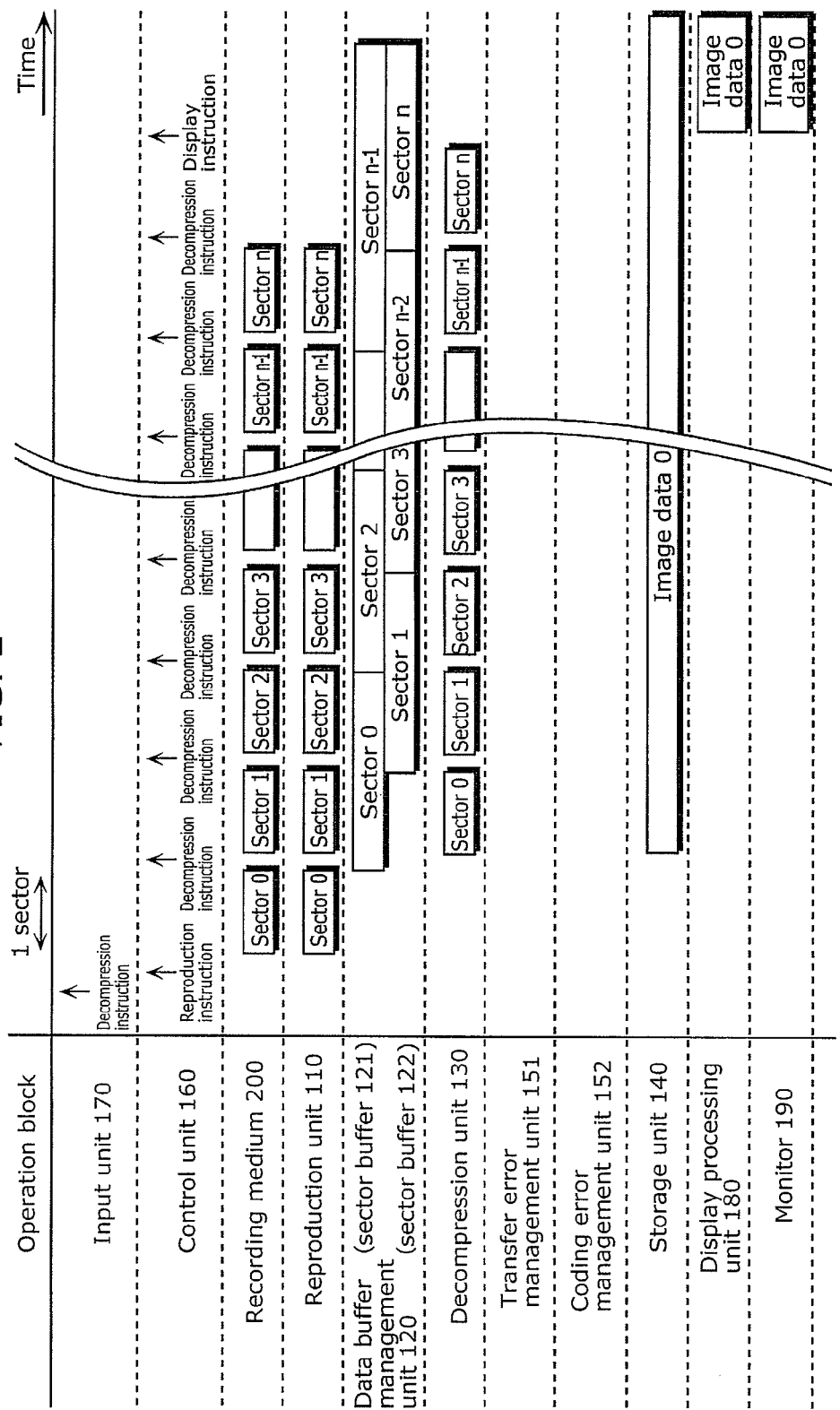
FIG. 2 is a conceptual diagram of an operation of the image reproduction apparatus according to the first embodiment of the present invention, in the case where no error occurs.

First, with reference to FIG. 2, the following describes a normal operation performed by the image reproduction apparatus 100 when the error is not detected. FIG. 2 is a conceptual diagram of an operation of the image reproduction apparatus 100 according to the first embodiment of the present invention, in the case where no error occurs.

The user instructs a decompression operation (decompression instruction) via the input unit 170. In response to the decompression instruction, the control unit 160 notifies the reproduction unit 110 of a reproduction instruction to start reading the compressed data from the recording medium 200. The reproduction unit 110 reads, from the recording medium 200, the compressed data indicated by the control unit 160 (the compressed data in which "image data 0" is compressed). The reading from the recording medium 200 is performed in a minimum unit of reading, that is, per sector, and the compressed data is transferred from the recording medium 200 to the data buffer management unit 120.

The data buffer management unit 120 manages the compressed data per sector in two banks (that is, the sector buffers 121 and 122), and stores the compressed data of an initial sector (sector 0) in bank 1 (sector buffer 121) first. Upon completion of the reading from the recording medium 200 and storage into the sector buffer 121, the reproduction unit 110 notifies, by interrupt processing, the control unit 160 that the storage of the compressed data per sector is completed.

The control unit 160 recognizes whether or not the transfer error has occurred in the sector, based on the notification from the transfer error management unit 151. The control unit 160 instructs the decompression unit 130 to decompress the compressed data of the sector when the sector includes no transfer error. The decompression unit 130 decompresses the compressed data of the specified sector, according to the decompression instruction from the control unit 160. The image data that is decompressed is timely stored in the storage unit 140.

The compressed data of the next sector (sector 1) that is read by the reproduction unit 110 is stored in the sector buffer 122 that is different from the previous sector buffer (in this case, bank 2), so as to prevent updating of the compressed data. When notified of the completion of the reading by the reproduction unit 110 and the completion of the decompression operation performed on the previous bank by the decompression unit 130, the control unit 160 instructs the decompression unit 130 to decompress the next bank.

The operation above is repeated until the completion of the reading of the compressed data from the recording medium 200 and the completion of the decompression. When the decompression on all the compressed data of one frame (sector 0 to sector n) is completed, the control unit 160 instructs the display processing unit 180 to start display of the image data (display instruction). The display processing unit 180, according to the display timing of the monitor 190, outputs the image data, causing the monitor 190 to display the image data.

As described above, the image reproduction apparatus 100 according to the first embodiment reads, per sector, the compressed image data from the recording medium 200. Then, the image reproduction apparatus 100 decompresses the compressed data that is read, and causes the monitor 190 to display the image data generated from the decompression.

Figure 3:
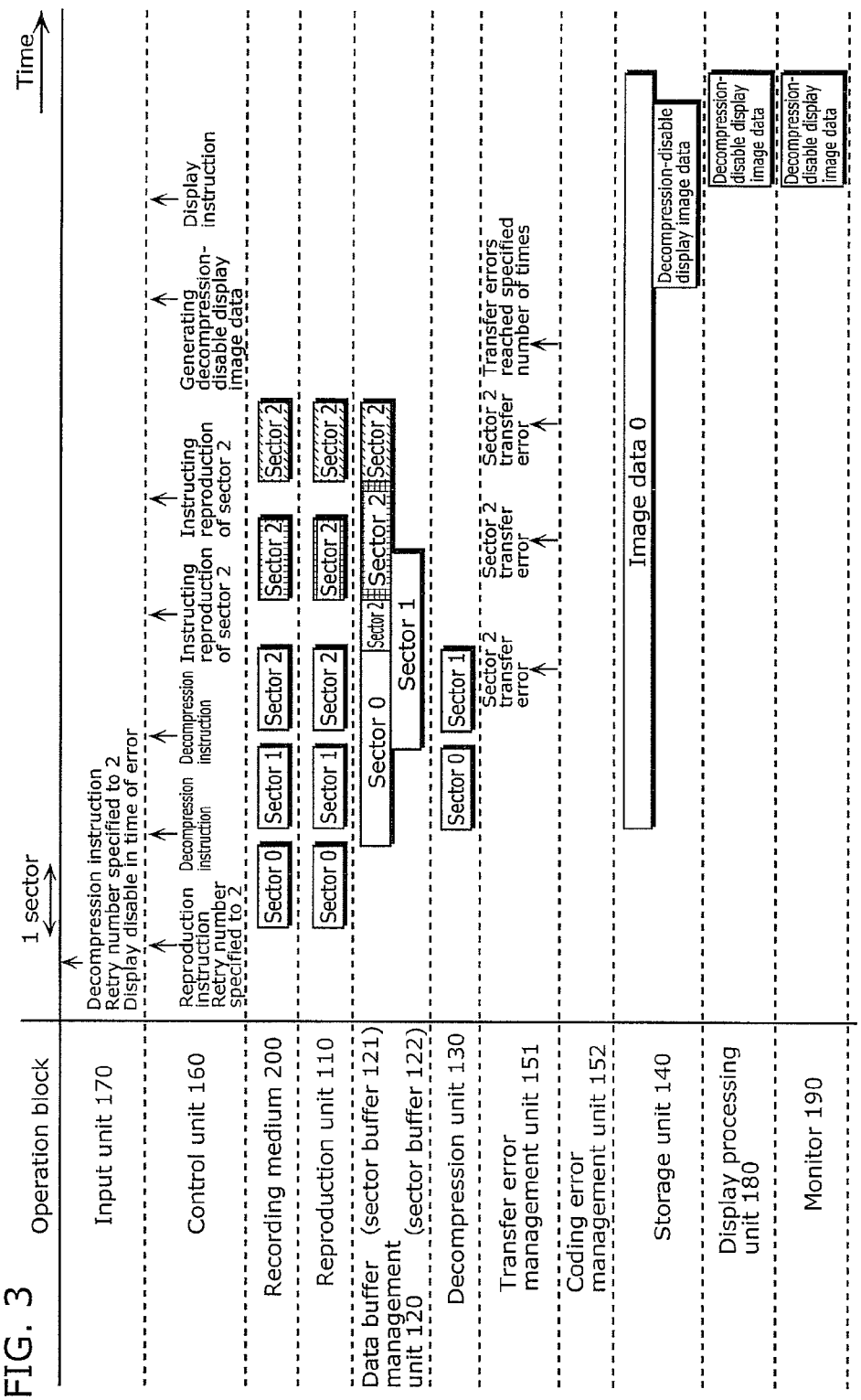
FIG. 3 is a conceptual diagram of the operation of the image reproduction apparatus according to the first embodiment of the present invention, in the case of not displaying partially-missing image data when a transfer error occurs.

Next, with reference to FIG. 3, the following describes an operation in the case of not displaying, when the transfer error occurs, an image that is partially missing due to the transfer error, among operations to be performed in the case of the transfer error occurring during the transfer processing from the recording medium 200 to the data buffer management unit 120. FIG. 3 is a conceptual diagram of the operation of the image reproduction apparatus 100 according to the first embodiment of the present invention in the case of not displaying partially-missing image data when the transfer error occurs. Note that the example shown in FIG. 3 assumes the case where the transfer error occurs during transfer of the compressed data of the sector 2.

In this case, before starting decompression, the user sets the retry number (specified number of times) in case of error occurrence (two times in the example of FIG. 3), and provides a setting for not displaying the image data in case of error occurrence. The operation until an occurrence of the transfer error is the same as the normal operation shown in FIG. 2.

When detecting the transfer error in the compressed data transferred by the reproduction unit 110, the transfer error management unit 151 notifies the control unit 160 that the transfer error has occurred ("sector 2 transfer error" shown in FIG. 3). At this time, the transfer error management unit 151 counts the transfer error number, compares the counted transfer error number with a predetermined number of times, and notifies the control unit 160 of a result of the comparison.

When the transfer error number is not above the specified number of times, the control unit 160 instructs the reproduction unit 110 to read, from the recording medium 200, the compressed data of the same sector, that is, the sector in which the transfer error has occurred (here, the sector 2) (retry processing). When the transfer error number is above the specified number of times, the control unit 160 suspends the processing of the sector in which the transfer error has occurred, and generates decompression-disable display image data which indicates that decompression is not possible.

Then, the control unit 160 stores the generated decompression-disable display image data into the storage unit 140, and instructs the display processing unit 180 to display the image data. The display processing unit 180, according to the display instruction, reads the decompression-disable display image data from the storage unit 140 and causes the monitor 190 to display the read data.

As described above, the image reproduction apparatus 100 according to the first embodiment causes the monitor 190 to display the decompression-disable display image data, when a transfer error occurs and when the transfer error number that is the number of transfer errors that have occurred is above the threshold (specified number of times). Specifically, the monitor 190 displays a message saying, for example, "Error occurred" or "Error occurred in data reading. Image display is not possible".

Note that retry is not performed when a coding error occurs in the case of the setting for the decompression-disable display in case of an error, and the control unit 160 performs the same processing as the processing to be performed after a point at which the transfer error number exceeds the specified number of times as shown in FIG. 3.

Figure 4:
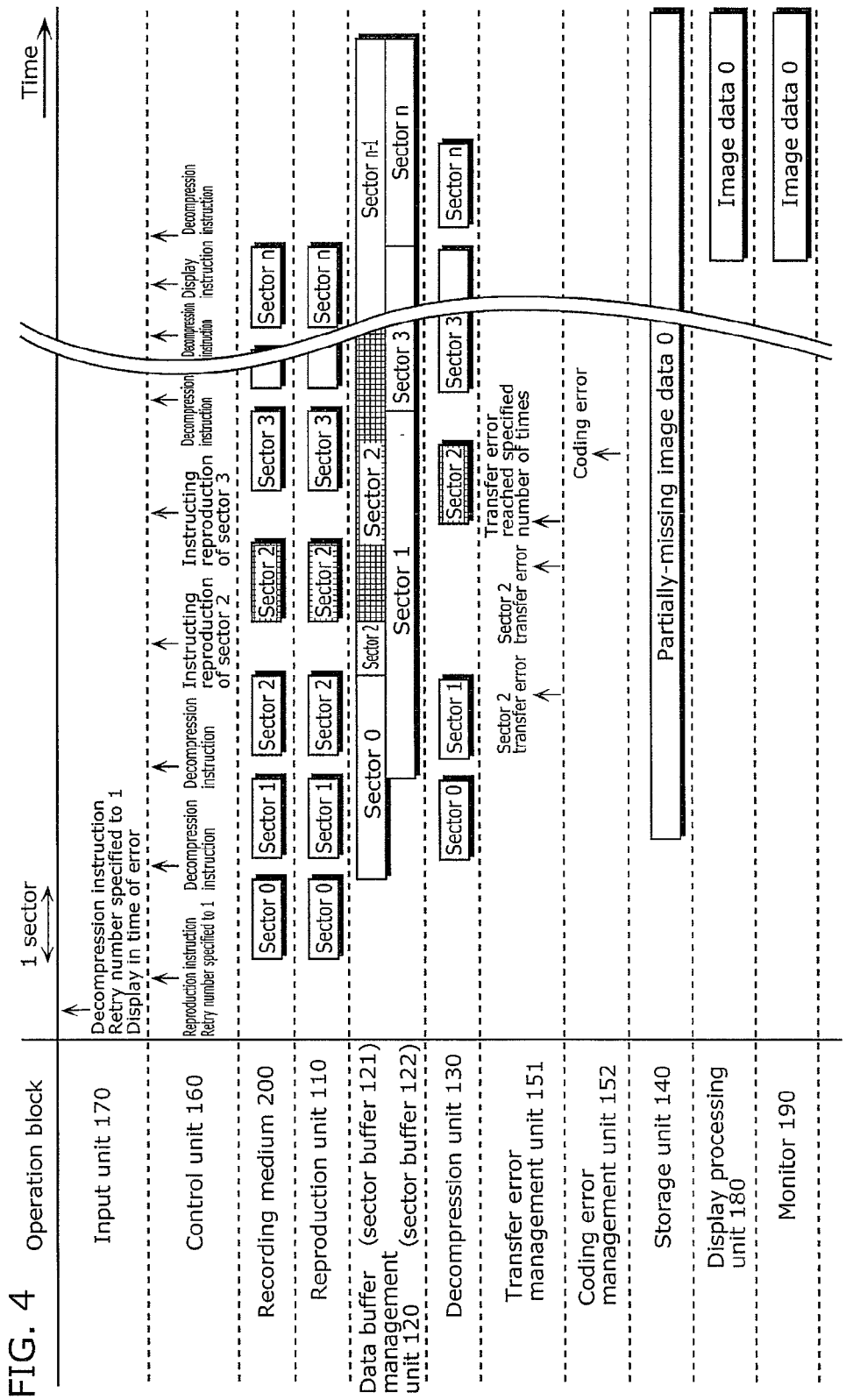
FIG. 4 is a conceptual diagram of the operation of the image reproduction apparatus according to the first embodiment of the present invention, in the case of displaying partially-missing image data when the transfer error occurs.

Subsequently, with reference to FIG. 4, the following describes an operation for displaying, even when an error occurs during the transfer processing from the recording medium 200 to the data buffer management unit 120, the image that is partially missing due to the transfer error. FIG. 4 is a conceptual diagram of the operation of the image reproduction apparatus 100 according to the first embodiment of the present invention in the case of displaying partially-missing image data when the transfer error occurs. Note that it is assumed that an RST marker is included in the compressed data.

In this case, before starting decompression, the user sets the retry number (specified number of times) in case of error occurrence (once in the example of FIG. 4), and also sets to display the image data in case of error occurrence. The operation until the transfer error number exceeds the specified number of times is the same as the operation shown in FIG. 3.

When it is set to display the image data when the error is detected, the decompression unit 130 decompresses the compressed data including the sector in which the transfer error has occurred (sector 2). In other words, regardless of whether the transfer error has been detected or not, the decompression unit 130 decompresses the compressed data of all the sectors.

However, the compressed data in the sector in which the transfer error has occurred is not normal data, and therefore is likely to cause a coding error. The control unit 160, when notified of the coding error from the coding error management unit 152, instructs the decompression unit 130 to perform the decompression, starting from the compressed data that is located at a point into which the RST marker is inserted and after the point at which the coding error has occurred (sector 3 in the example in FIG. 4).

The operations above are repeated until the completion of the reading of the compressed data from the recording medium 200 and the completion of the decompression. Note that the decompression is completed at a point when the coding error occurs during the decompression processing performed on the compressed data located after the last RST marker in the compressed data.

Upon completion of the decompression, the control unit 160 instructs the display processing unit 180 to start display (display instruction). The display processing unit 180 reads from the storage unit 140 and displays on the monitor 190, the partially-missing image data.

As described above, the image reproduction apparatus 100 according to the first embodiment causes the monitor 190 to display the partially-missing image data, when a transfer error occurs and the transfer error number that is the number of transfer errors that have occurred is above the threshold (specified number of times). In this processing, as described later, the image region that is missing is complemented with the predetermined complement image data by the control unit 160.

In addition, in the case of the compressed data including the RST marker, it is possible to reliably restore the decompression operation based on the RST marker, thus increasing reproducibility of the image data. For the processing for restoring the decompression of the error data using the RST marker, the technique is known and disclosed in Patent Reference 2 and so on, and thus the description thereof is omitted.

Note that as shown in FIG. 4, as long as the decompression unit 130 is able to finish decompression by the time the display processing unit 180 reads the image data from the storage unit 140, the display instruction may be notified in advance, without waiting for the decompression to be completed by the decompression unit 130.

Note that when the compressed data does not include the RST marker, it is not possible to decompress the compressed data from the point at which the coding error has occurred. Thus, the control unit 160 notifies the display processing unit 180 of the display instruction when the coding error is detected.

Figure 5:
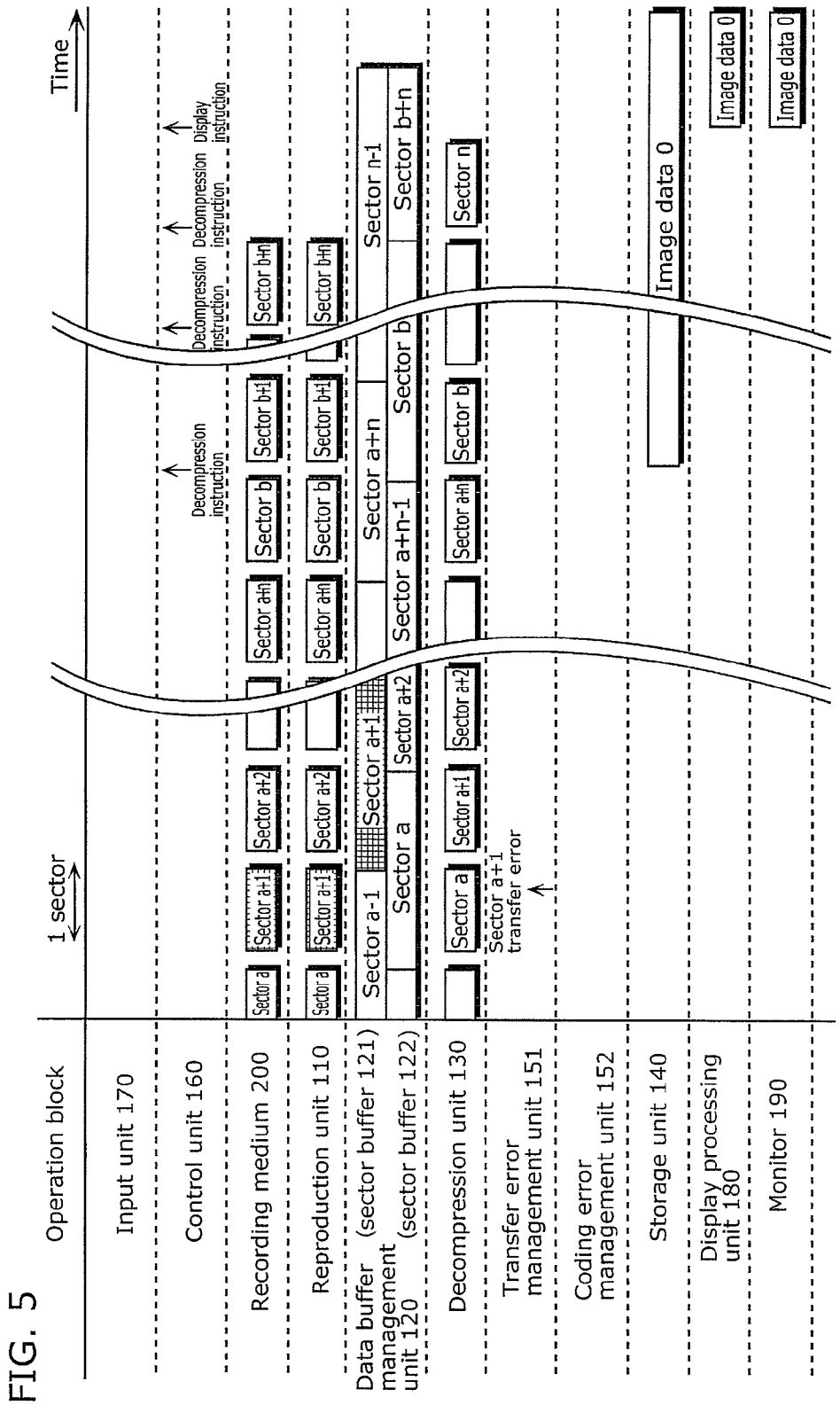
FIG. 5 is a conceptual diagram of the operation of the image reproduction apparatus according to the first embodiment of the present invention, when a transfer error occurs during reading of an APP marker.

Next, with reference to FIG. 5, the following describes an operation in the case of the transfer error occurring during the reading of the unit compressed data included in the APP marker. FIG. 5 is a conceptual diagram of the operation of the image reproduction apparatus 100 according to the first embodiment, in the case of the transfer error occurring during reading of the APP marker. Note that the APP marker is data arbitrarily attached to the compressed data according to the JPEG schemes. Thus, even when the APP marker is not properly decompressed, this does not affect the original image data.

The example in FIG. 5 shows an operation in the case where: the decompression operation has already started; the APP marker is included up to sector a+n; and the image data itself is included after sector b. Accordingly, for skipping the reading of the APP marker, the decompression unit 130 outputs, to the storage unit 140, the image data (decompressed data) after the sector b.

As shown in FIG. 5, even when the transfer error management unit 151 detects the transfer error at the sector a+1, the control unit 160 does not stop the decompression operation. The decompression unit 130 starts the decompression operation, from a point at which the accumulated number of sectors read by the reproduction unit 110 exceeds an APP marker length (sector b in the example in FIG. 5).

In addition, the control unit 160 may generate, after causing the decompression operation to be performed, image data or text data indicating that the transfer error has occurred, so as to inform the user of the occurrence of the transfer error. The generated image data or text data is output to the monitor 190 via the display processing unit 180, and the monitor 190 displays the image data or text data indicting the occurrence of the transfer error. For example, the monitor 190 displays a message such as "Transfer error occurred".

As described above, the image reproduction apparatus 100 according to the first embodiment does not suspend the decompression operation even when a transfer error occurs during the reading of the APP marker, and decompresses the compressed data from the point at which the APP marker ends, that is, starting from unit compressed data that is not included in the APP marker. With this, by avoiding decompression from being suspended due to the transfer error occurring in the information attached to the compressed data such as the APP marker, it is possible to perform the decompression processing as long as the image data itself does not include an error. Note that the image reproduction apparatus 100 according to the first embodiment may continue decompression processing when the transfer error occurs not only in reading the APP marker but also in reading the attached information that is other than the image data itself.

Figure 6:
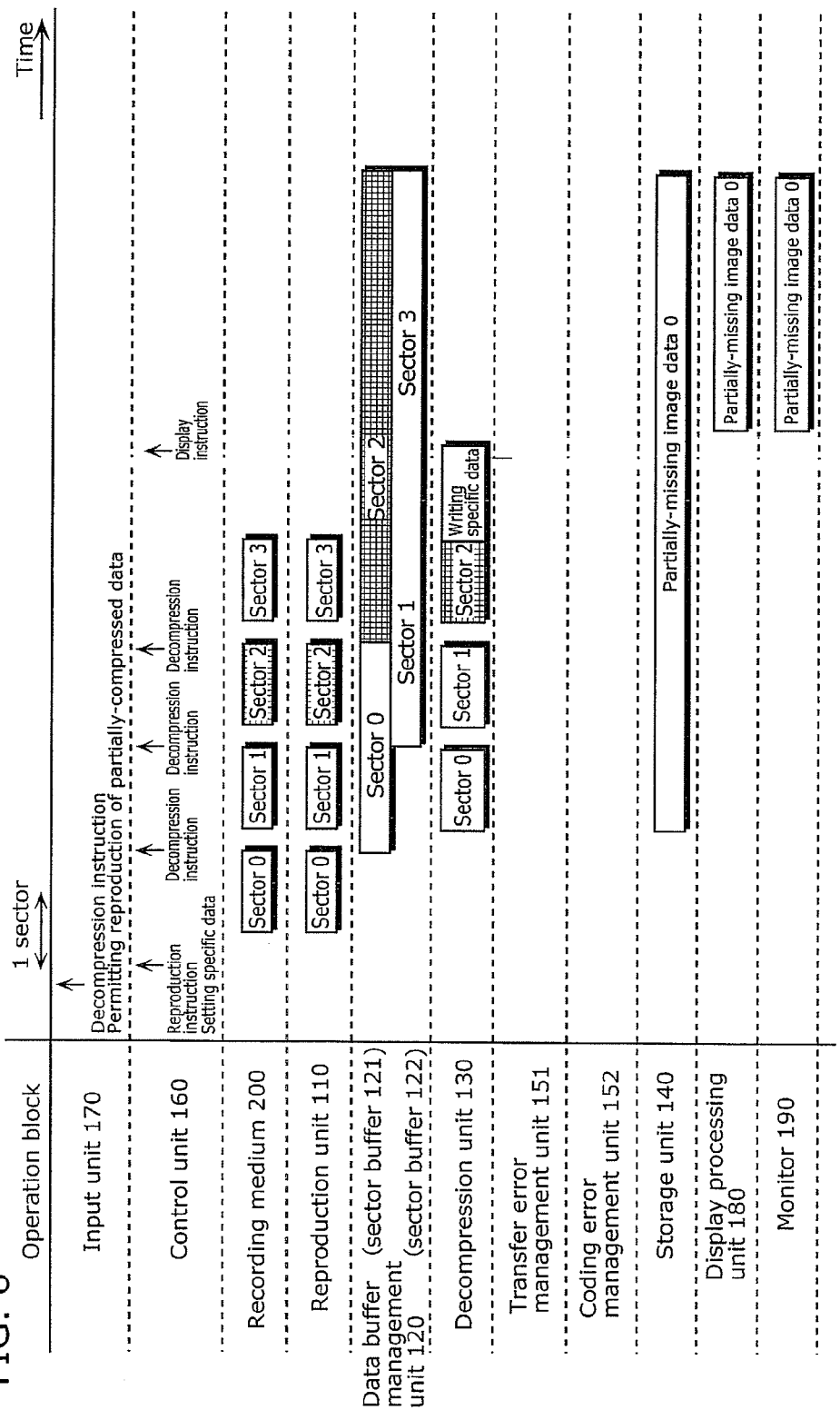
FIG. 6 is a conceptual diagram of the operation of the image reproduction apparatus according to the first embodiment of the present invention, in the case of decompressing partially-compressed data.

Next, with reference to FIG. 6, the following describes an operation for decompressing incomplete compressed data that has resulted from the interrupted compression processing during the compression or for other reasons. FIG. 6 is a conceptual diagram of an operation of the image reproduction apparatus 100 according to the first embodiment, in the case of decompressing incomplete compressed data (hereinafter, partially-compressed data) that has resulted from the interrupted compression processing or for other reasons. In this context, the partially-compressed data additionally includes specific data (hereinafter, a specific code) indicating that the compression processing is interrupted, that is, the data is incomplete.

The user, through the input unit 170, permits the reproduction of the partially-compressed data which is compressed data having a portion embedded with the specific data, and instructs to perform decompression. The control unit 160 sets the specific code to the decompression unit 130, and thereby the decompression unit 130 suspends the decompression operation upon detecting the specific code. Then, instead of decompressing the remaining data, the decompression unit 130 outputs specific image data, for example, in black or blue, subsequent to the already decompressed data.

In the example shown in FIG. 6, the specific code is present in the sector 2, and the decompression unit 130 writes the specific image data into the storage unit 140 after detecting the specific code. Upon completing the writing, into the storage unit 140, of the specific image data of a size equivalent of the image data that should originally be present, the decompression unit 130 outputs a decompression completion interrupt to the control unit 160. The control unit 160 instructs the display processing unit 180 to display the partially-missing image data.

Figure 7:
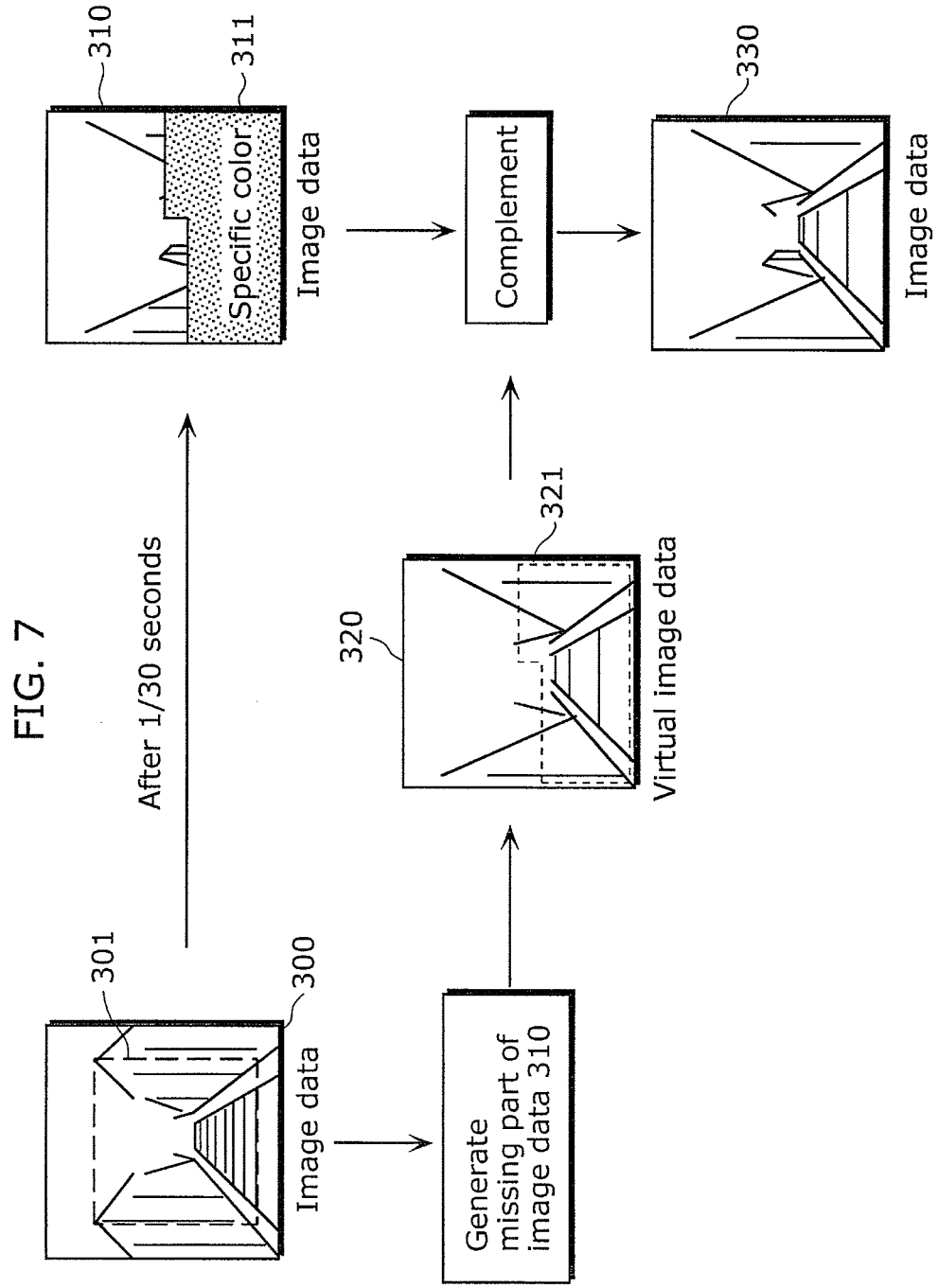
FIG. 7 is a conceptual diagram of complement processing to be performed on the partially-compressed data when decompressing video.

FIG. 7 is a conceptual diagram of complement processing that is to be performed on the partially-compressed data when decompressing video. In the example shown in the figure, the video includes: image data 300 of one frame that is normally-compressed image data, and image data 310 that is image data in a frame next to the image data 300 and includes the specific data (specific code). Here, it is assumed that the image data 300 is normally decompressed.

In addition, the specific code is, for example, coding data for specifying the specific image data. For example, the specific code is data, as represented by FFFFFFFFFF55A030, which includes: a series of a specific number of "FF"s that is invalid data as JPEG data (in this case, 10 FFs), which is followed by a series of specific image data in order of Y, Cb, and Cr (in this case, Y=8'h55, Cb=8'hA0, Cr=8'h30).

Note that normally, in video, adjacent frames are often similar and thus information of the adjacent frames is utilized to enhance the reproducibility of the image data. In addition, not only in the video but also in high-speed serial shooting of still images, it is possible to use the adjacent frame information for the image data having a high correlation between a previous captured image and a current captured image.

Generally, a Huffman decoding error is considered to occur when the specific data is included in the Huffman code region in the image data, that is, when the specific data is included until detection of the end of image (EOI) "FFD9" that indicates an end of the image; however, in the present embodiment, since the specific code is previously inserted into the image that is not reproducible due to the error, this specific code has no disadvantage of disabling reproduction.

In addition, conventionally, without displaying the frame in which the error has been detected, a previous frame is continuously displayed, or the current frame is blacked out. However, according to the present embodiment, it is also possible to display the image data 310 that is partially-compressed data.

In the image data 310, an image region 311 provided with a description "specific color" in FIG. 7 is entirely filled with the specific image data that is generated during compression. This allows recognizing a change in the image as much as possible although the image is partially missing.

In addition, when using image data similar to the image data 310 (here, the image data 300 that is an immediately preceding frame) for complementing the missing image region in the image data 310, the control unit 160 generates, from the immediately-preceding image data 300, virtual image data 320 corresponding to the image data 310. The example shown in FIG. 7 is video captured from a train running on the tracks, and a frame 301 of the image data 300 is a region corresponding to the next frame (image data 310); accordingly, the virtual image data 320 is generated using an enlarged inner portion of the frame 301.

Note that the frame 301, in this context, is determined using information at the time of imaging, for example: field angle information, the frame rate of the video, and speed information of the train or global positioning system (GPS) information.

Then, the missing part (image region 311 in FIG. 7) that is included in the image data 310 and includes the specific data is complemented by fitting, into the missing part, the data included at the same image position in the virtual image data 320 (a frame 321 indicated by a dotted line in FIG. 7). This allows obtaining the image data 330 representing higher reproducibility than the image data 310.

Figure 8:
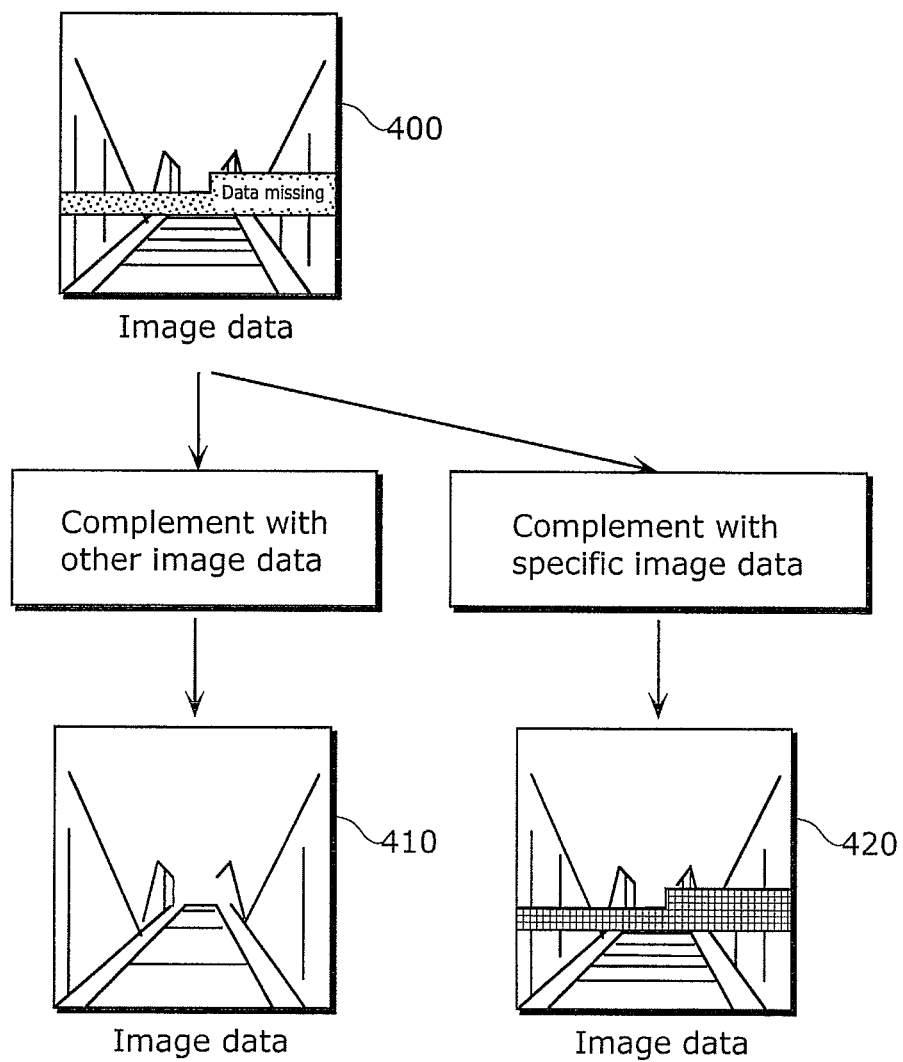
FIG. 8 is a conceptual diagram of the complement processing when an error occurs in the compressed data into which an RST marker is inserted.

In addition, FIG. 8 is a conceptual diagram of the complement processing in the case of an error occurring in the compressed data into which the RST marker is inserted. Image data 400 is an example of image data that is decompressed excluding the region in which the error has occurred, that is, the partially-decompressed image that is to be displayed on the monitor 190. Although part of the image data region is missing, such inclusion of the RST marker allows normal decompression starting from an RST marker subsequent to the RST marker at which the error has occurred, thus restoring the image data from the point at which the decompression is normally performed.

Image data 410 is image data obtained by complementing this image data 400 with other image data as in the case of FIG. 7. In addition, image data 420 is image data obtained by entirely filling the missing image data region with the specific data that is, in this case, gray image data (Y=8'h55, Cb=8'h80, Cr=8'h80). In either case, this facilitates recognizing the original image data, compared to the case of not allowing display on the monitor 190 at all due to error occurrence.

Note that instead of being complemented with other image data, the missing region may be complemented using image data around the missing region.

Subsequently, the operation of the image reproduction apparatus 100 according to the first embodiment is described with reference to the drawings.

Figure 9:
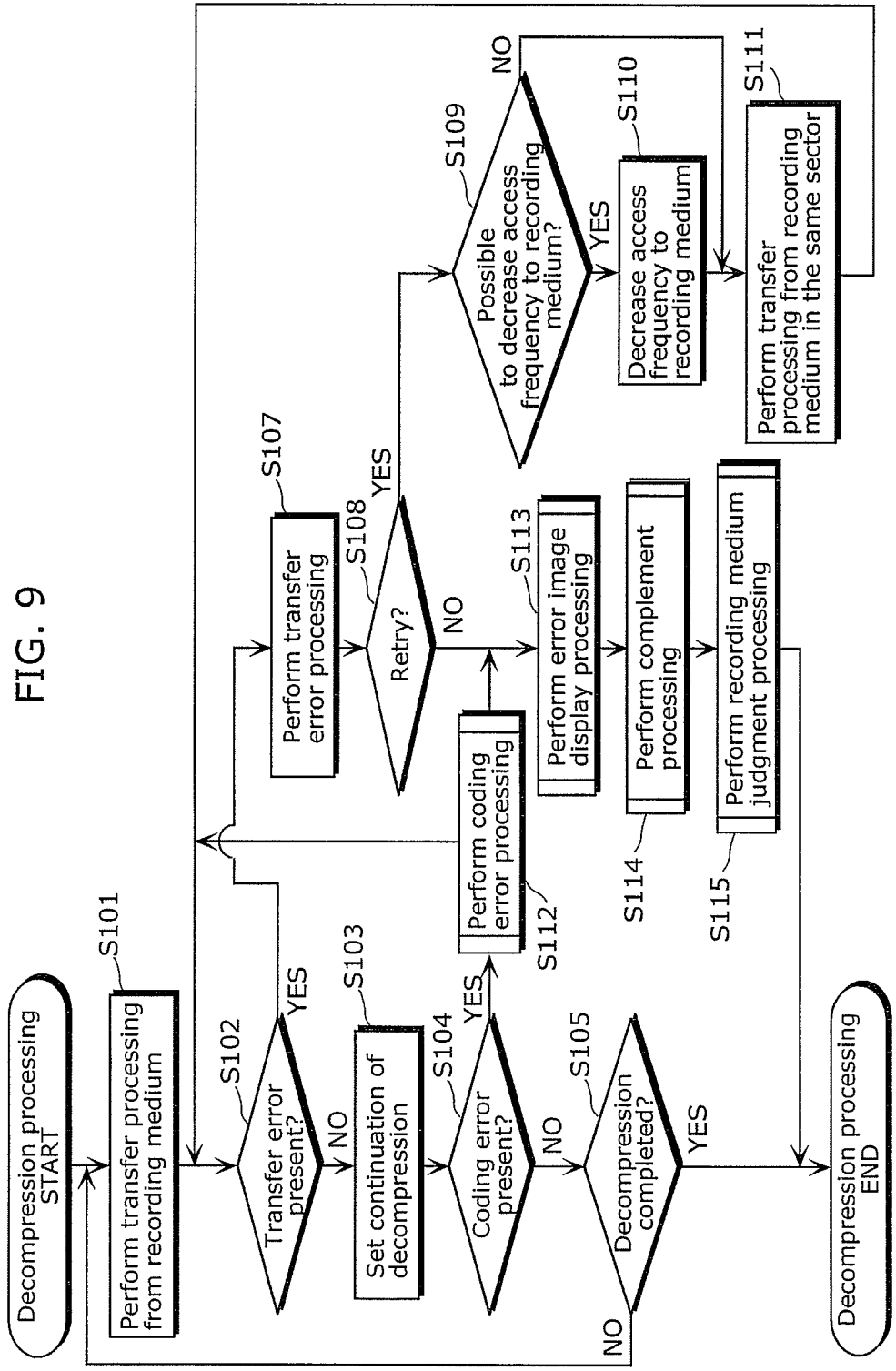
FIG. 9 is a flowchart showing decompression processing performed by the image reproduction apparatus according to the first embodiment of the present invention.

FIG. 9 is a flowchart showing decompression processing performed by the image reproduction apparatus 100 according to the first embodiment of the present invention.

Upon starting the decompression processing based on the decompression instruction that is input from the input unit 170, the control unit 160 notifies the reproduction unit 110 of the reproduction instruction to start processing of transferring the compressed data from the recording medium 200. With this, the reproduction unit 110 reads the compressed data from the recording medium 200 per sector (S101). The compressed data that is read is stored by the data buffer management unit 120, into one of the sector buffers 121 and 122.

When the reproduction unit 110 reads, per sector, the compressed data from the recording medium 200, the transfer error management unit 151 checks whether or not a transfer error has occurred in the compressed data that is read (S102). When the transfer error management unit 151 does not detect the transfer error (NO in S102), the control unit 160 instructs the decompression unit 130 to decompress the compressed data in the sector buffer 121 or 122 (notifies the decompression instruction). The decompression unit 130 reads the compressed data from the sector buffer 121 or 122, and starts the operation of decompressing the compressed data that is read (S103).

Then, the coding error management unit 152 checks whether or not the code of the compressed data has a coding error (S104). When the coding error is not detected (NO in S104), the control unit 160 detects whether or not the decompression processing on the compressed data to be decompressed is completed (S105). When the decompression processing is not completed (NO in S105), the compressed data of the next sector is read from the recording medium 200 (the processing returned to S101).

When the decompression processing is completed (YES in S105), the image reproduction apparatus 100 finishes the decompression processing. Note that the decompressed data generated by the decompression unit 130 decompressing the compressed data is stored in the storage unit 140. Then, the display processing unit 180 reads the decompressed data from the storage unit 140 and causes the monitor 190 to display the read data.

When the transfer error management unit 151 detects the transfer error (YES in S102), the image reproduction apparatus 100 performs transfer error processing (S107). The following describes the details of the transfer error processing with reference to FIG. 10.

Figure 10:
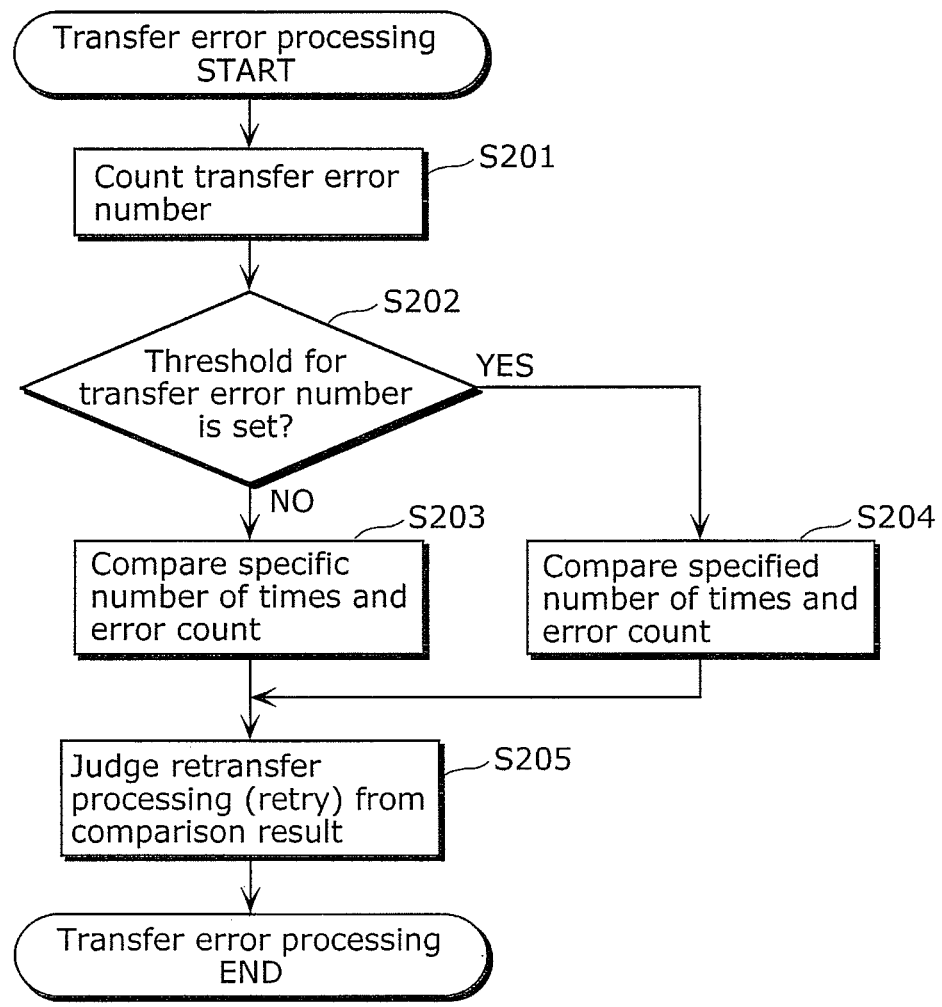
FIG. 10 is a flowchart showing transfer error processing performed by the image reproduction apparatus according to the first embodiment of the present invention.

FIG. 10 is a flowchart showing the transfer error processing (S107 in FIG. 9) performed by the image reproduction apparatus 100 according to the first embodiment of the present invention. Note that the transfer error processing here is processing performed by the image reproduction apparatus 100 when the transfer error occurs and is, for example, the processing that has been described with reference to FIGS. 3 to 5.

First, the transfer error management unit 151 counts the transfer error number (S201). Next, the transfer error management unit 151 judges whether or not the threshold for the transfer error number is set (S202). In other words, the transfer error management unit 151 judges whether or not the input unit 170 has obtained a user instruction indicating a threshold for the transfer error number and whether or not the control unit 160 has set the threshold for the transfer error number (specified number of times) according to the user instruction.

When the threshold for the transfer error number is not set (NO in S202), the transfer error management unit 151 compares a specific number of times and the counted transfer error number (S203). The result of the comparison is notified to the control unit 160. Note that the specific number of times is a default threshold that is predetermined.

When the threshold for the transfer error number is set (YES in S202), the transfer error management unit 151 compares the counted transfer error number with the specified number of times (S204). The result of the comparison is notified to the control unit 160.

Then, the control unit 160 judges whether or not to perform retransfer processing (re-performance of the transfer processing from the recording medium 200, that is, retry processing), based on the comparison result (S205). Specifically, the control unit 160 judges whether or not the counted transfer error number is above the specific or specified number of times, and determines that retransfer processing is not to be performed when the counted number is above the specific or specified number of times. The control unit 160 determines that retransfer processing is to be performed, when the counted number is equal to or below the specific or specified number of times.

With the processing above, the transfer error processing is terminated. The following describes, back to FIG. 9, processing after the transfer error processing.

When it is determined that the retry processing (retransfer processing) is not to be performed (NO in S108), based on the result of the transfer error processing (S107), the image reproduction apparatus 100 performs error image display processing (S113). The details of the error image display processing are to be described later with reference to FIG. 12.

In addition, when determining that retry is to be performed (YES in S108), the control unit 160 judges whether or not it is possible to decrease the access frequency to the recording medium 200 (S109). When decreasing the access frequency is possible (YES in S109), the control unit 160 instructs the reproduction unit 110 to perform the retransfer processing by decreasing the access frequency to the recording medium 200, and the reproduction unit 110 decreases the access frequency in accordance with the instruction from the control unit 160 (S110). The reproduction unit 110 reads the compressed data in the same sector from the recording medium 200 by re-accessing the recording medium 200 at the decreased access frequency (S111).

When decreasing the access frequency is not possible (NO in S109), the control unit 160 notifies the reproduction unit 110 of the instruction to perform retransfer processing on the same sector, and the reproduction unit 110 reads the compressed data in the same sector by re-accessing the recording medium 200 at the same access frequency (S111).

Then, the transfer error management unit 151 judges whether or not the transfer error has occurred in the compressed data that is read (S102), and the image reproduction apparatus 100 repeats the processing above.

When the transfer error management unit 152 detects a coding error (YES in S104), the image reproduction apparatus 100 performs coding error processing (S112). The following describes the details of the coding error processing with reference to FIG. 11.

Figure 11:
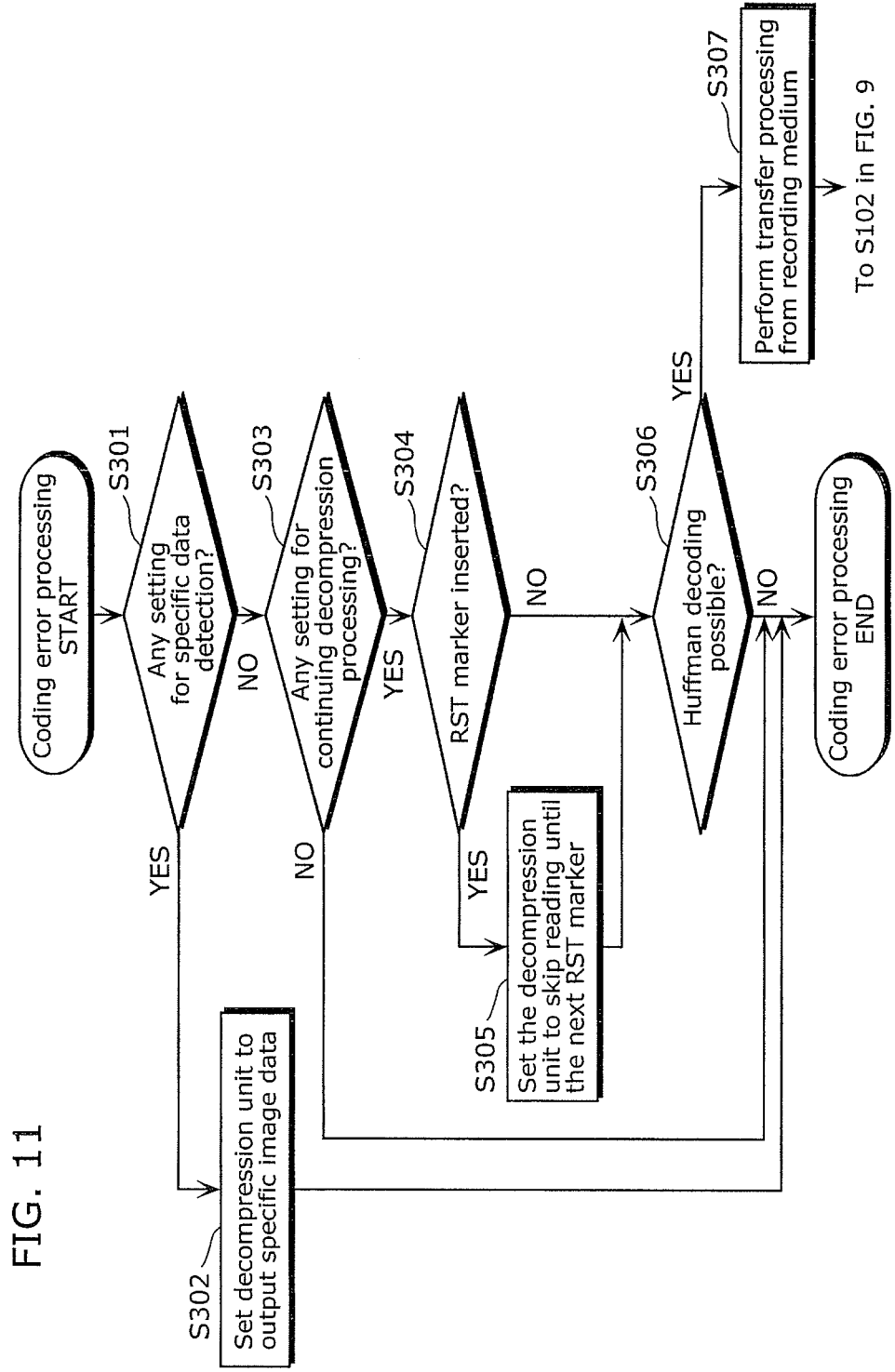
FIG. 11 is a flowchart showing coding error processing performed by the image reproduction apparatus according to the first embodiment of the present invention.

FIG. 11 is a flowchart showing the coding error processing (S112 in FIG. 9) performed by the image reproduction apparatus 100 according to the first embodiment. Note that the coding error processing here is processing to be performed by the image reproduction apparatus 100 when the coding error occurs.

In the coding error processing, the control unit 160 determines first whether or not it is set to detect the specific data embedded in the Huffman code region in the compressed data (S301). When it is set to detect the specific data (YES in S301), the control unit 160 sets the decompression unit 130 to output the specific image data, and outputs the image data of a specific color, for example, black or gray, as the image data corresponding to the remaining image data (S302). Upon completion of the output of image data of an image data size (of one frame), the image reproduction apparatus 100 finishes the coding error processing.

When it is set not to detect the specific data (NO in S301), the control unit 160 determines whether or not it is set to continue the decompression processing (S303). When the continuation of the decompression processing is not set (NO in S303), the image reproduction apparatus 100 finishes the coding error processing.

When the continuation of the decompression processing is set (YES in S303), the decompression unit 130 detects whether or not the RST marker is inserted into this compressed data (S304). When the RST marker is inserted (YES in S304), the control unit 160 sets the decompression unit 130 to skip the reading of the compressed data until the next RST marker (S305). The decompression unit 130 does not perform the decompression operation until detecting the next RST marker in the compressed data stored in the sector buffer 121 or 122 by the reproduction unit 110.

Next, the control unit 160 judges whether or not the decoding processing by the decompression unit 130 is possible (S306). In the case of processing per unit of the RST marker (YES in S306), Huffman decoding processing is possible, so that the reproduction unit 110 performs the transfer processing from the recording medium 200, so as to read the compressed data of the next sector (S307). Subsequently, the image reproduction apparatus 100 repeats the processing from the transfer error judgment processing (S102 in FIG. 9).

In addition, when the RST marker is not inserted (NO in S304), some compressed data determined as a coding error allows the Huffman decoding processing, and therefore the control unit 160 judges whether or not the Huffman decoding processing by the decompression unit 130 is possible (S306). When the Huffman decoding processing is possible (YES in S306), the reproduction unit 110 performs, likewise, the transfer processing from the recording medium 200 (S307). Subsequently, the image reproduction apparatus 100 repeats the processing from the transfer error judgment processing (S102 in FIG. 9).

When the Huffman decoding processing is not possible (NO in S306), the image reproduction apparatus 100 finishes the coding error processing, and performs error image display processing (S113 in FIG. 9). The following describes details of the error image display processing with reference to FIG. 12.

Figure 12:
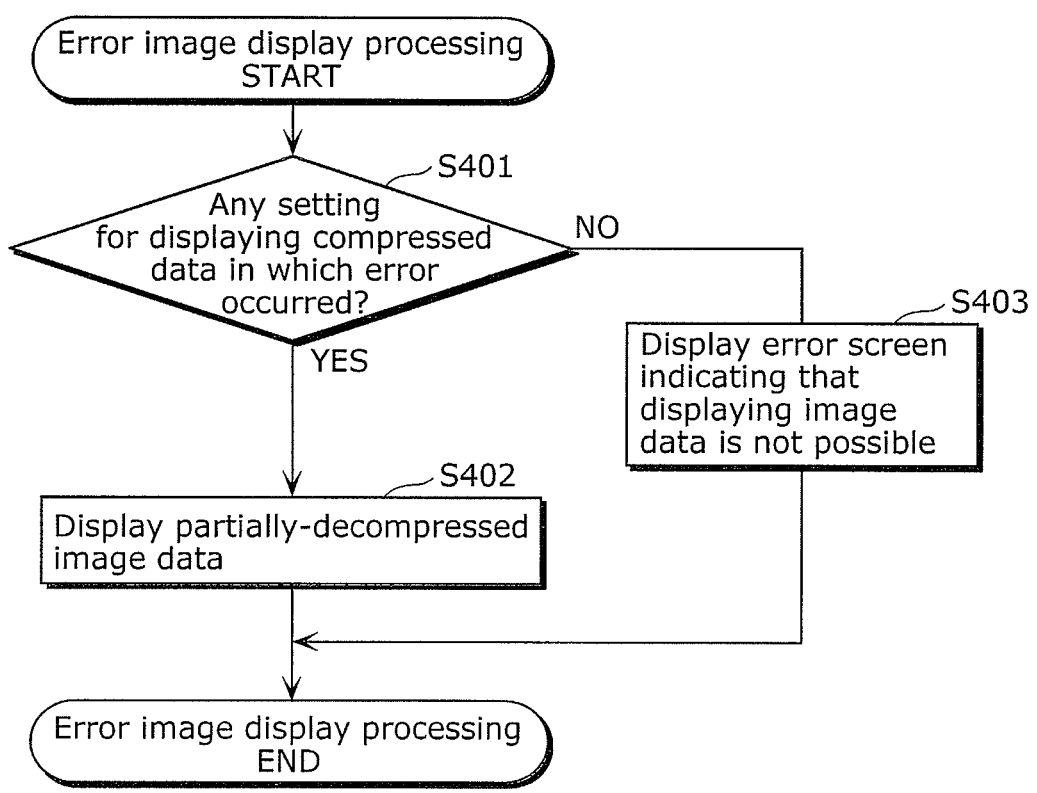
FIG. 12 is a flowchart showing error image display processing performed by the image reproduction apparatus according to the first embodiment of the present invention.

FIG. 12 is a flowchart showing the error image display processing (S113 in FIG. 9) performed by the image reproduction apparatus 100 according to the first embodiment. Note that the error image display processing here is image display processing when an error such as a transfer error or a coding error occurs.

Here, the control unit 160, first, judges whether or not it is set to display, on the monitor 190, the compressed data in which the error has occurred (S401). When it is set to display the image data generated by decompressing the compressed data in which the error has occurred (YES in S401), the control unit 160 sets the display processing unit 180 to output, to the monitor 190, the data stored in the storage unit 140, so as to display the image data that is halfway decompressed up to a point at which the error has occurred (S402). The image reproduction apparatus 100 finishes the error image display processing and performs complement processing (S114 in FIG. 9).

In addition, when it is set not to display the image data that is obtained by decompressing the compressed data in which the error has occurred (NO in S401), the control unit 160 generates error display image data in the storage unit 140 (for example, image data for displaying such text as "Unable to reproduce this file"), and provides a setting for causing the display processing unit 180 to output, to the monitor 190, the error display image data stored in the storage unit 140 (S403). Then, the image reproduction apparatus 100 finishes the error image display processing and performs complement processing (S114 in FIG. 9). Note that the display processing unit 180 outputs the error image data or error display image data, according to the display timing of the monitor 190.

Figure 13:
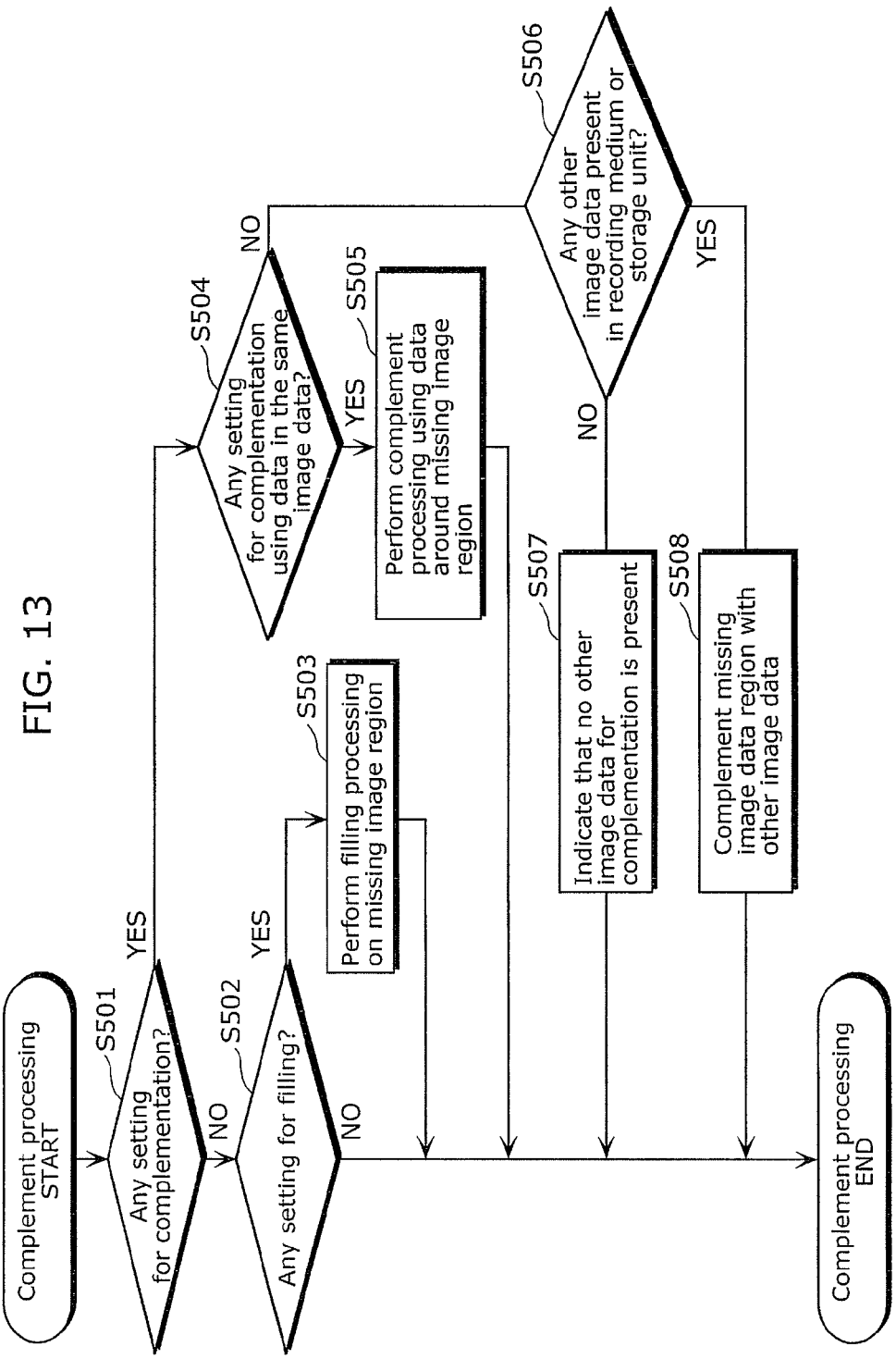
FIG. 13 is a flowchart showing complement processing performed by the image reproduction apparatus according to the first embodiment of the present invention.

The following describes details of the complement processing with reference to FIG. 13.

FIG. 13 is a flowchart showing the complement processing (S114 in FIG. 9) performed by the image reproduction apparatus 100 according to the first embodiment. Note that the complement processing here is processing for complementing the image data that is missing due to error occurrence.

First, the control unit 160 judges whether or not the complement processing is set (S501). When the complement processing is not set (NO in S501), the control unit 160 judges whether or not processing for filling the missing image region is set (S502). When the filling processing is not set (NO in S502), the image reproduction apparatus 100 finishes the complement processing.

When the filling processing is set (YES in S502), the control unit 160 fills the missing image region in the image data stored in the storage unit 140, with image data in black, gray, or yellow, for example (S503). The image generated by this filling processing corresponds to, for example, the image data 420 in FIG. 8. Upon completion of the filling processing, the image reproduction apparatus 100 finishes the complement processing.

In addition, when the complement processing is set (YES in S501), the control unit 160 judges whether or not the complement processing using image data in the same image data is set (S504). When it is set to perform complementation within the same image data (YES in S504), the control unit 160 complements the missing image data by generating the image data for the missing region from the image around the missing image region (S505). Then, the image reproduction apparatus 100 finishes the complement processing.

When it is set not to perform complementation within the same image data (NO in S504), the control unit 160 judges whether or not it is possible to use other image data (S506). Specifically, the control unit 160 determines whether or not the recording medium 200 or the storage unit 140 holds image data or compressed data that is other than the compressed data in which the error has occurred. Here, the other image data is, for example, image data similar to the image data in which the error has occurred, such as an image preceding or succeeding by one frame, or an image serially captured at the same place and time.

When there is no other image data (NO in S506), the control unit 160 notifies that the other image data to be used for the complementation is not present (S507). Specifically, the control unit 160 generates no-file image display data in the storage unit 140 (for example, image data for displaying such text as "Other file is not present; unable to complement"), and provides a setting for causing the display processing unit 180 to output, to the monitor 190, the no-file display image data that is stored in the storage unit 140. Then, the image reproduction apparatus 100 finishes the complement processing.

Note that in this context, when no other image data is present (NO in S506), the missing image region may be filled with image data in a single color, instead of displaying the no-file display image data.

When the other data is present (YES in S506), the control unit 160 complements the missing image data by generating the image data for the missing image region from image data of a portion that is included in the other image data and corresponds to the missing image region (S508). The image generated by this complementation corresponds to, for example, the image data 410 in FIG. 8. Then, the image reproduction apparatus 100 finishes the complement processing.

As described above, upon finishing the complement processing, the image reproduction apparatus 100 performs recording medium judgment processing (S115). The following describes details of the recording medium judgment processing with reference to FIG. 14.

Figure 14:
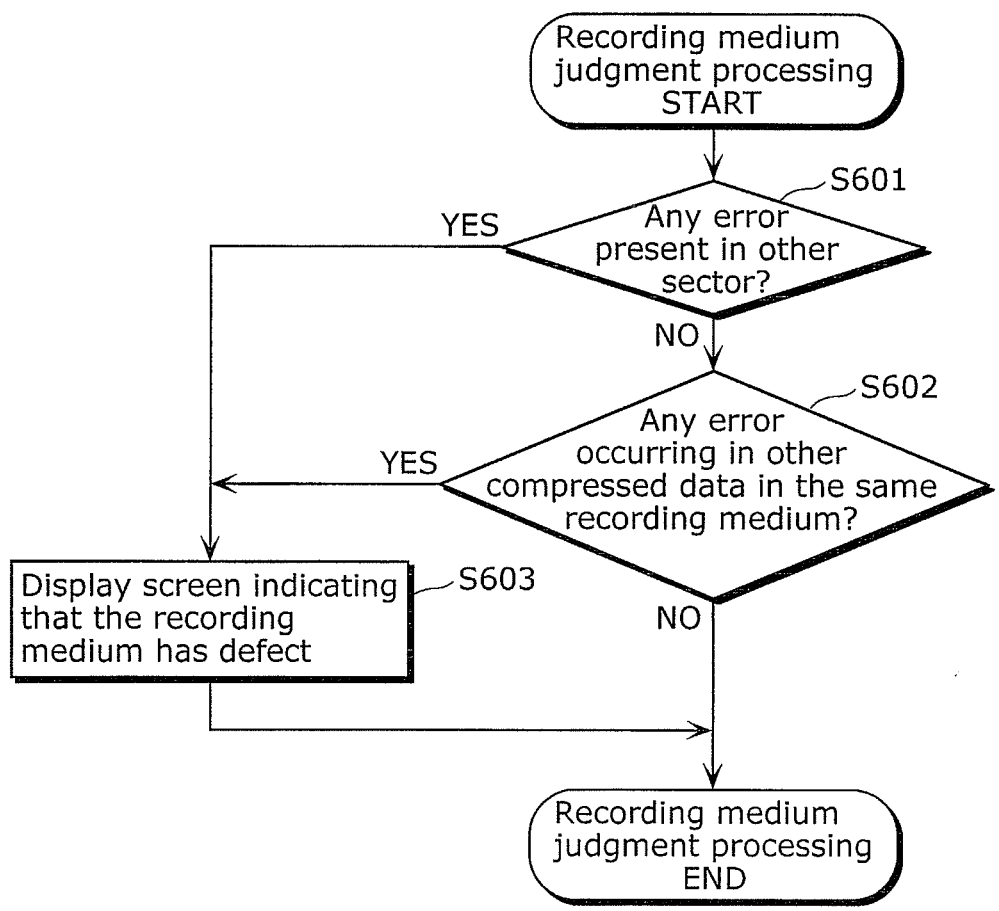
FIG. 14 is a flowchart showing recording medium judgment processing performed by the image reproduction apparatus according to the first embodiment of the present invention.

FIG. 14 is a flowchart showing the recording medium judgment processing performed by the image reproduction apparatus 100 according to the first embodiment of the present invention. Note that the recording medium judgment processing here is processing for judging whether the recording medium 200 on which the compressed data to be read is recorded is in a satisfactory condition or has a defect.

First, the control unit 160 judges whether or not an error has been detected in another sector in the same compressed data (compressed data indicating the same frame)(S601). When no error is detected in another sector in the same compressed data (NO in S601), the control unit 160 judges whether or not an error has been detected in other compressed data (compressed data indicating another frame) on the same recording medium 200 (S602). When no error is detected in the other compressed data on the same recording medium 200 (NO in S602), the control unit 160 determines that the recording medium 200 is normal, and the image reproduction apparatus 100 finishes the recording medium judgment processing.

When an error is detected in another sector in the same compressed data (YES in S601), or when the error is detected in the other compressed data on the same recording medium 200 (YES in S602), an image notifying that the recording medium 200 has a defect is displayed on the monitor 190 (S603). Specifically, the control unit 160 generates recording-medium-error display image data in the storage unit 140 (for example, image data for displaying such text as "This memory card is broken; unable to reproduce"), and provides a setting for causing the display processing unit 180 to output, to the monitor 190, the recording-medium-error display image data that is stored in the storage unit 140. Then, the image reproduction apparatus 100 finishes the recording medium judgment processing. When finishing the recording medium judgment processing (S115), the image reproduction apparatus 100 finishes the decompression processing.

As described above, the image reproduction apparatus 100 according to the first embodiment judges whether or not an error has occurred in the compressed data that is read, and changes processing for the error according to the type and number of the errors that have occurred.

For example, the image reproduction apparatus 100 determines whether or not to display the image data in the case of error occurrence, thus allowing the monitor 190 to display the image data that is partially missing due to the error even when the error occurs.

In addition, when the transfer error occurs, it is possible to retransfer the data from the recording medium 200. In this context, the user is able to set, through the input unit 170, whether or not the retransfer is to be performed, the number of transfers to be re-performed, and so on.

Thus, the image reproduction apparatus 100 according to the first embodiment can flexibly process decompressed data that is already generated when the error occurs.

Second Embodiment

An image recording apparatus according to a second embodiment of the present invention compares a frame rate for capturing video data (capturing frame rate) and a frame rate for compressing the captured image data (compression frame rate). Then, when the result of the comparison indicates that the capturing frame rate is higher than the compression frame rate, the compression processing currently performed on one frame is suspended, and the specific data is embedded in the Huffman code region, so as to record, on a recording medium, compressed data including partially normally-compressed data and the specific data. The following describes, first, a configuration of an image recording apparatus according to the second embodiment, with reference to FIG. 15.

Figure 15:
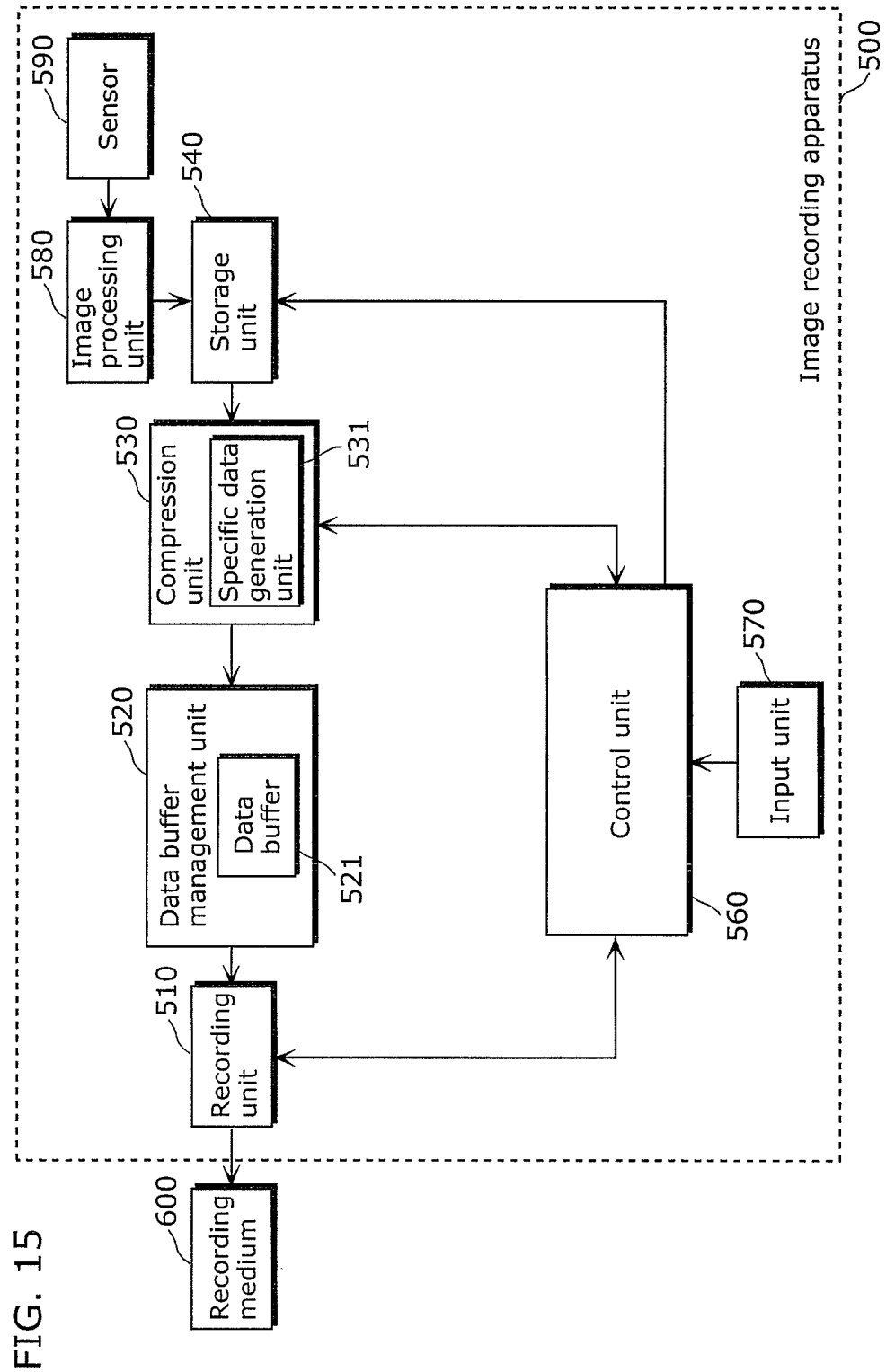
FIG. 15 is a block diagram showing an example configuration of an image recording apparatus according to a second embodiment of the present invention.

FIG. 15 is a block diagram showing an example configuration of an image recording apparatus 500 according to the second embodiment.

As shown in FIG. 15, the image recording apparatus 500 includes: a recording unit 510, a data buffer management unit 520, a compression unit 530, a storage unit 540, a control unit 560, an input unit 570, an image processing unit 580, and a sensor unit 590. The image recording apparatus 500 compresses image data obtained by the sensor 590, and records the compressed image data onto a recording medium 600 such as an SD card and a HDD.

The sensor 590 is an image sensor such as a charge coupled device (CCD) and a complementary metal oxide semiconductor (CMOS). The sensor 590 obtains RAW data by imaging a subject. The RAW data is, for example, RGB data.

The storage unit 540 is a memory for storing image data converted by the image processing unit 580.

The image processing unit 580 converts, into image data, the RAW data obtained by the sensor 590 and stores the image data into the storage unit 540. Here, the image data is image data including: luma information (Y) and chroma information (Cb, Cr).

The compression unit 530 reads image data from the storage unit 540 and compresses the read image data according to the JPEG schemes. The compressed data that is the compressed image data is output to the data buffer management unit 520.

In addition, the compressed unit 530 includes a specific data generation unit 531. The specific data generation unit 531 adds, to the compressed data, specific data predetermined by the control unit 560, when notified, by the control unit 560, of an instruction to interrupt the compression processing. The compression unit 530 outputs, to the data buffer management unit 520, compressed data that includes normally-compressed data and the specific data.

The data buffer management unit 520 includes a data buffer 521, and stores, into the data buffer 521, the compressed data output from the compression unit 530, per the minimum unit of reading of the recording medium 600. Note that FIG. 15 shows a configuration of the data buffer management unit 520 including one data buffer 521, but the data buffer management unit 520 may include one or more data buffers.

The recording unit 510 writes compressed data from the data buffer management unit 520 onto the recording medium 600.

The control unit 560 controls the processing of the entire image recording apparatus 500 by providing an instruction to each processing unit included in the image recording apparatus 500. For example, the control unit 560 notifies each processing unit of a user instruction obtained through the input unit 570.

For example, the control unit 560 compares the capturing frame rate at which the image processing unit 580 captures the RAW data from the sensor 590, converts the RAW data into image data, and stores the image data into the storage unit 540, and the compression frame rate at which the compression unit 530 reads and compresses the image data from the storage unit 540. The control unit 560 notifies the compression unit 530 of a compression suspension instruction, based on a determination that timely performance of compression processing is not possible, when the capturing frame rate is higher than the compression frame rate. Specifically, the control unit 560 determines that the timely performance of the compression processing is not possible when two or more compression instructions are input through the input unit 570 during the compression processing of one frame.

The input unit 570 is a user interface through which the user instruction is obtained from the user, and through which the obtained user instruction is transmitted to the control unit 560. For example, the input unit 570 obtains, from the user, a compression instruction indicating a start of a series of processing that is to be performed by the image recording apparatus 500, from capturing of the data, to the compression, to the recording of the data onto the recording medium 600.

With the configuration described above, the image recording apparatus 500 according to the second embodiment compares the capturing frame rate and the compression frame rate, and embeds, when the capturing frame rate is higher than the compression frame rate, the specific data into the Huffman code region while suspending the compression processing that is being performed on one frame. This allows compression and recording of the image data if only partially, compared to the conventional case of not performing compression and recording of the image data of one frame.

Subsequently, the operation of the image recording apparatus 500 which is performed when the capturing frame rate is higher than the compression frame rate is described with reference to FIG. 16.

Figure 16:
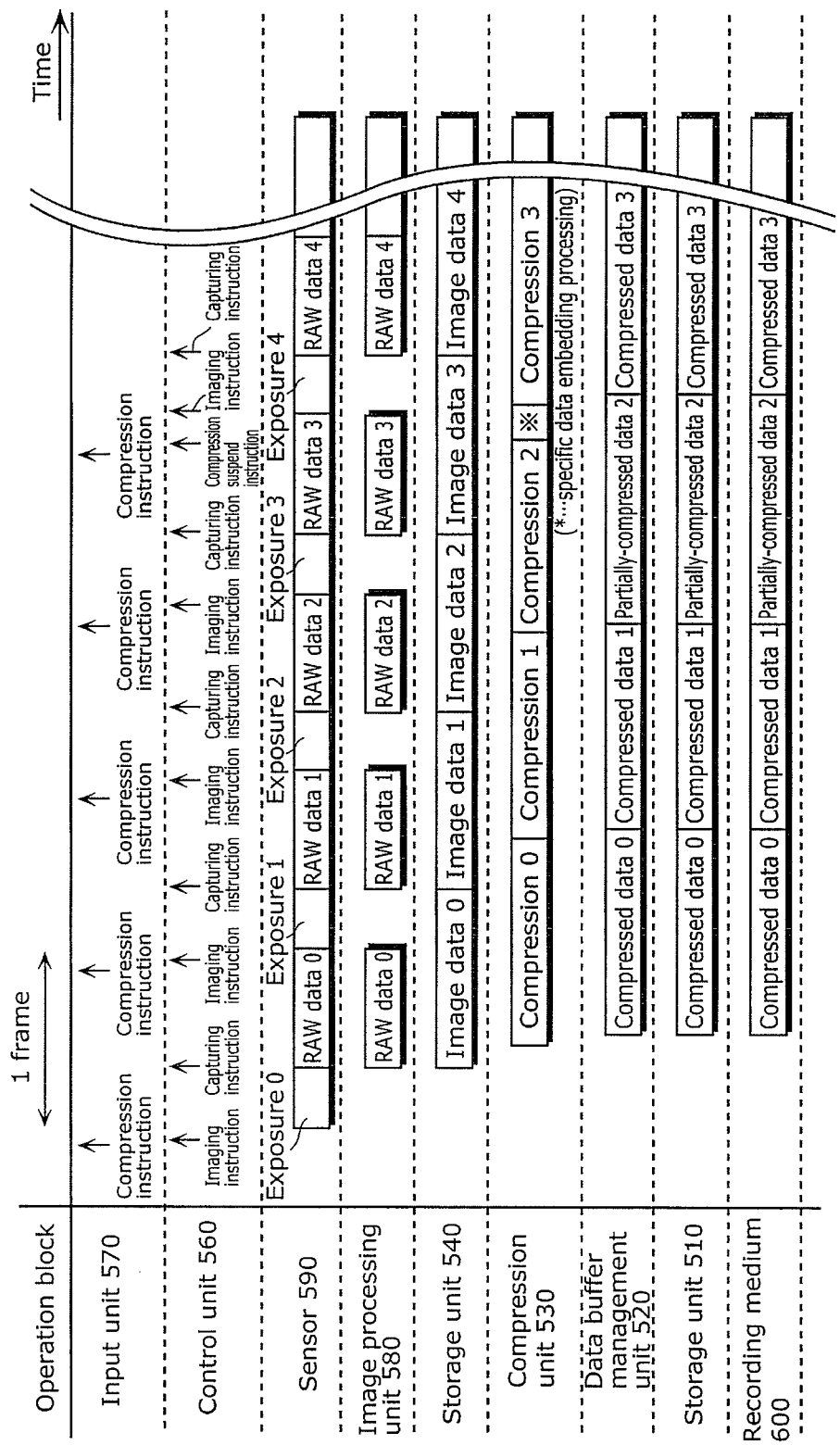
FIG. 16 is a conceptual diagram of an image recoding apparatus according to the second embodiment of the present invention.

FIG. 16 is a conceptual diagram of the image recoding apparatus 500 according to the second embodiment of the present invention.

The user provides the compression instruction through the input unit 570, and the control unit 560 transmits, to the sensor 590, an imaging instruction to start exposure. After completion of the exposure by the sensor 590, the control unit 560 transmits a capturing instruction to the sensor 590 and the image processing unit 580, so as to capture the RAW data into the storage unit 540. With this, the sensor 590 outputs the RAW data, and the image processing unit 580 converts the RAW data into the image data including luma information and chroma information, and stores the converted image data into the storage unit 540.

The compression unit 530 compresses the image data stored in the storage unit 540, and stores the compressed image data in the data buffer 521 in the data buffer management unit 520. The recording unit 510 reads the compressed data stored in the data buffer 521 and records the read compressed data onto the recording medium 600.

FIG. 16 shows that the capturing frame rate from the sensor 590 is higher, when comparing the capturing frame rate for capturing the data from the sensor 590 (an interval from the imaging instruction to the next imaging instruction in FIG. 16) and the compression frame rate for compression processing (each frame in the compression unit 530 in FIG. 16). As a result, the compression unit 530 is not able to perform real-time processing.

Normally, consistency between the capturing processing and the compression processing is adjusted by skipping frames to be processed by the compression unit 530. More specifically, since the compression processing for the image data of one frame is skipped, the image data of one frame is not recorded. However, as shown in the example of FIG. 16, the compression unit 530 performs as much processing as possible, so as to reserve frame information if only a little.

In this context, as a criterion for determining whether or not to suspend the compression processing and perform writing processing of the specified data, the control unit 560 determines that the compression processing is timely performed when one compression instruction is input from the input unit 570 during the compression performed on the image data of one frame. In contrast, when the input unit 570 receives a plurality of compression instructions, during the compression processing performed on the image data of one frame, the control unit 560 determines that the compression processing is in delay, and suspends the compression processing at the point.

For example, as shown in FIG. 16, when two compression instructions are received during the compression processing, as shown by "Compression 2" for the compression unit 530, it is determined that the compression operation is in delay. When the compression operation is in delay, the control unit 560 adjusts consistency with real-time processing by notifying the compression unit 530 of the compression suspension instruction, and thereby causing the compression unit 530 to suspend the compression operation. In this context, the compression unit 530, while suspending the compression processing, adds the specific data predetermined by the control unit 560 to the compressed data that is halfway generated, and outputs the data to the data buffer management unit 520. The recording unit 510 records the partially-compressed data including the specific data, onto the recording medium 600.

Figure 17:
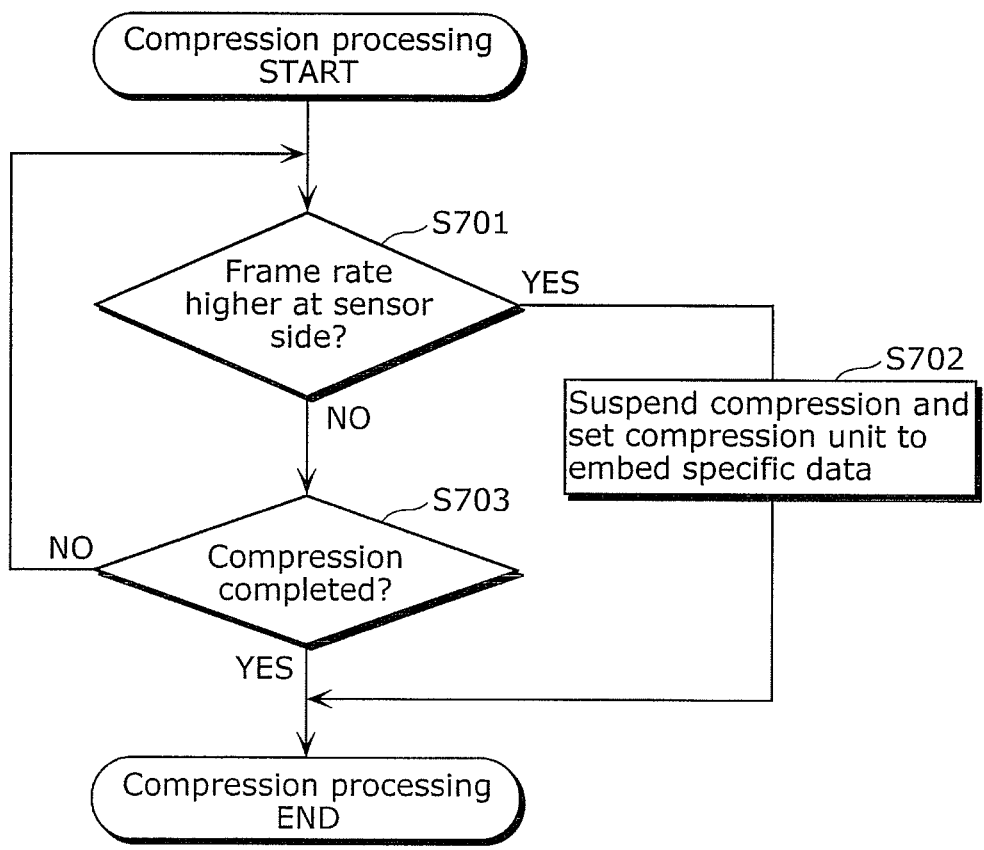
FIG. 17 is a flowchart showing compression processing performed by the image recording apparatus according to the second embodiment of the present invention.

Subsequently, the operation of the image recording apparatus 500 according to the second embodiment is described with reference to FIG. 17. FIG. 17 is a flowchart showing compression processing performed by the image recording apparatus 500 according to the second embodiment of the present invention.

The image recording apparatus 500 according to the second embodiment starts compression processing based on the compression instruction that is input through the input unit 570. When the compression processing is started, as shown in FIG. 16, the sensor 590 obtains the RAW data according to the control by the control unit 560, and the image processing unit 580 converts the RAW data into image data and stores the converted image data into the storage unit 540. Then, the compression unit 530 compresses the image data stored in the storage unit 540 and the recording unit 510 records the compressed data onto the recording medium 600.

In this processing, as shown in FIG. 17, the control unit 560 compares the capturing frame rate and the compression frame rate (S701). When the capturing frame rate is higher (YES in S701), the control unit 560 notifies the compression unit 530 of an instruction to interrupt the compression processing. At this time, the control unit 560 provides a setting for the compression unit 530 to embed the specific data. The compression unit 530, subsequent to the compressed data that is normally compressed, embeds the specific data determined by the control unit 560 (S702).

In addition, when the compression frame rate is constantly higher (NO in S701), the control unit 560 determines whether or not the compression processing is to be completed (S703). When recognizing the completion of the compression processing performed by the compression unit 530 (YES in S703), the image recording apparatus 500 finishes the compression processing.

As described above, the image recording apparatus 500 according to the second embodiment compares the capturing frame rate and the compression frame rate, and when the capturing frame rate is higher than the compression frame rate, the image recording apparatus 500 embeds the specific data and also suspends the compression processing that is being performed on one frame. This allows compression and recording of the image data if only partially, compared to the conventional case of not performing compression and recording of the image data of one frame.

Thus far, an image reproduction apparatus and an image reproduction method according to an implementation of the present invention has been described based on embodiments of the present invention, but the present invention is not limited to these embodiments. Those skilled in the art will readily appreciate that many modifications are possible in the exemplary embodiments without materially departing from the novel teachings and advantages of this invention. Accordingly, all such modifications are intended to be included within the scope of this invention.

Figure 18:
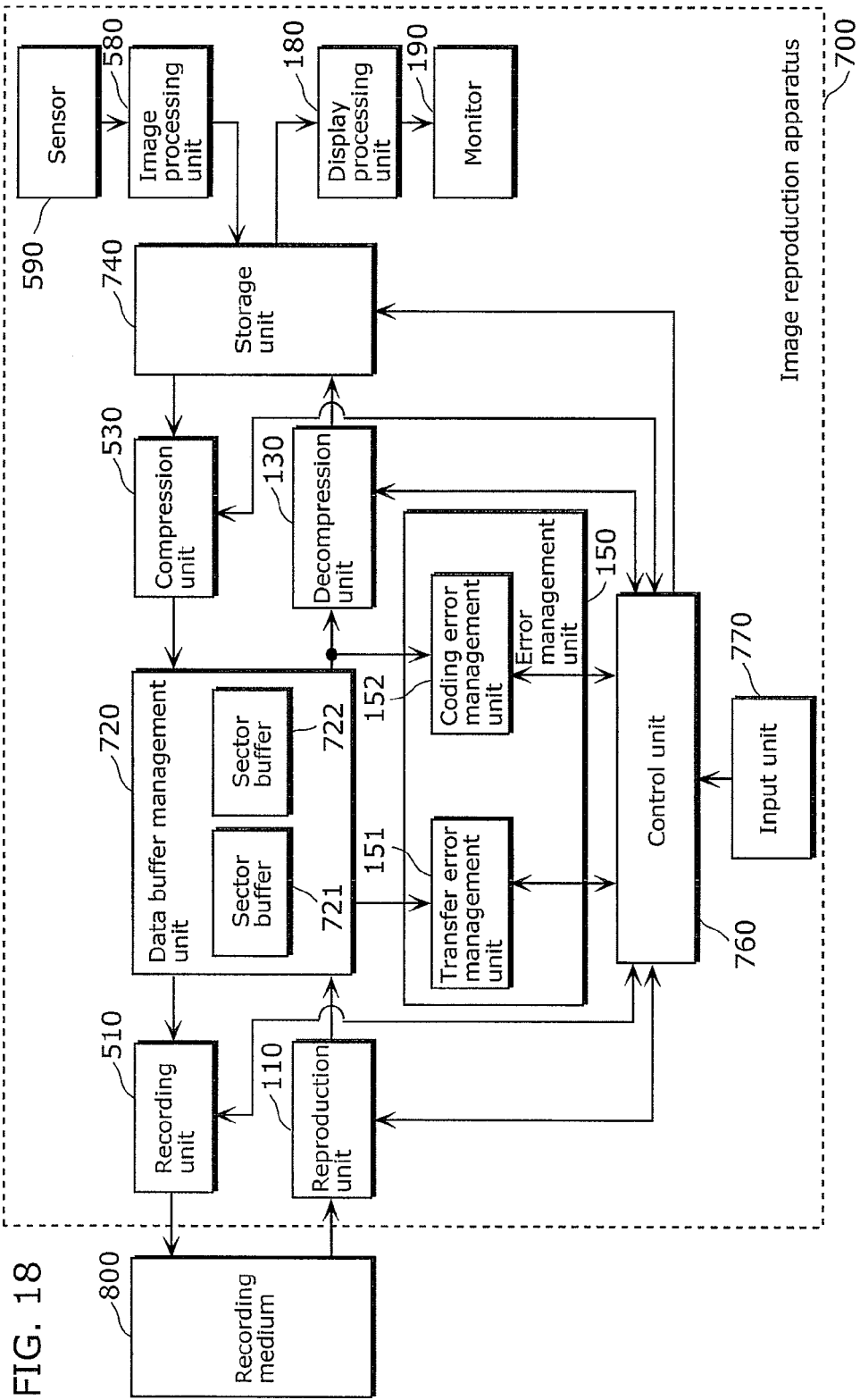
FIG. 18 is a block diagram showing another example configuration of an image reproduction apparatus according to an embodiment of the present invention.

For example, the present invention may be an imaging device realized by a combination of the image reproduction apparatus 100 and the image recording apparatus 500 described above. FIG. 18 is a block diagram showing an example of another configuration of an image reproduction apparatus according to an embodiment of the present invention.

An image reproduction apparatus 700 shown in FIG. 18 includes: the reproduction unit 110, the decompression unit 130, the error management unit 150, a display processing unit 180, a monitor 190, the recording unit 510, the compression unit 530, the image processing unit 580, the sensor 590, the data buffer management unit 720, the storage unit 740, the control unit 760, and the input unit 770. The same constituent elements as those in FIGS. 1 and 15 are assigned with the same numerical references.

The image reproduction apparatus 700 is, for example, an imaging device such as a digital camera, and compresses the image data obtained by the sensor 590 and records the compressed data onto a recording medium 800. Furthermore, the image reproduction apparatus 700 reads the compressed data from the recording medium 800, decompresses the compressed data that is read, and displays the obtained image data on the monitor 190.

The data buffer management unit 720 performs the processing performed by both of the data buffer management units 120 and 520. As shown in FIG. 18, as an example, the data buffer management unit 720 includes sector buffers 721 and 722. The sector buffers 721 and 722 correspond to sector buffers 121 and 122, the data buffer 521, and so on.

The storage unit 740 corresponds to the storage units 140 and 540. Note that the storage unit 740 may be physically two memories, or may be physically one memory that is logically segmented.

The control unit 760 corresponds to the control units 160 and 560, and controls the processing of the entire image reproduction apparatus 700 by performing the control that is performed by the both control units. The input unit 770 corresponds to the input units 170 and 570, and performs the processing that is performed by the both input units.

As described above, the image reproduction apparatus 700 may have the functions of both the image reproduction apparatus 100 and the image recording apparatus 500.

In addition, in the first embodiment, the data buffer management unit 120 has been described as including two buffer capacities; however, this is not the only case, and three or more data buffers may be included. Specifically, when there are fluctuations in both the transfer speed of the reproduction unit 110 and the processing speed of the decompression unit 130, it is better to include a sufficient number of data buffers to absorb the difference in speed so as to hide waiting time for the processing to be performed by the reproduction unit 110 or the decompression unit 130.

In addition, in the first embodiment, the data has been stored in the bank 1 (sector buffer 121) first in the data buffer management unit 120; however, this is not the only case, and the data may be stored in the bank 2 (sector buffer 122).

In addition, in the first embodiment, when the decompressed image data is not of an image data size displayable on the monitor 190, the image may be resized so as to allow display on the monitor 190, by at least one of the decompression unit 130, the display processing unit 180, and the control unit 160.

In addition, although in the first embodiment, the decompression-disable display image data has been described as being generated at the time of error occurrence, the decompression-disable display image data may be generated in advance. In addition, when the storage unit 140 has sufficient memory space, by storing therein the decompression-disable display image data that is once generated, it is not necessary to generate such image data each time.

In addition, in the first embodiment, the occurrence of the error in the data in the APP marker has been described as being indicated after the display of the image data, but the error occurrence may be previously indicated to allow the user to select whether or not to display the image data.

In addition, in the first embodiment, in the example operation shown in FIG. 5, all the compressed data has been described as being input into the decompression unit 130, but the data from the sector b may be input. In this case, when part of the data of the APP marker is present in the sector b, the decompression unit 130 skips reading of the data, and performs the decompression operation from the data after the APP marker.

In addition, in the first embodiment, for complementing the missing region of the image data, in the example shown in FIG. 7, the complement image data is generated by enlarging the previous frame, but the next frame may be generated by predicting motion of the subject or predicting the next frame from an angle speed sensor of the camera.

In addition, in the first embodiment, the data buffer management unit 120 is provided so that the reading from the recording medium 200 and the decompression in the decompression unit 130 are performed at the same time, but the reproduction unit 110 may transfer compressed data from the recording medium 200 to the storage unit 140, and the decompression unit 130 may read and decompress the compressed data from the storage unit 140.

In addition, in the second embodiment, the RAW data is described as the data to be captured from the sensor 590; however, this is not the only case, and the image recording apparatus 500 may obtain the image data, and the compression unit 530 may compress the image data that is obtained. In addition, the compression may be performed after performing conversion such as resizing if necessary.

In addition, in each of the embodiments, the specific data has been specified as the data including a sequence of 10 "FF"s followed by Y, Cb, and Cr; however, this is not the only case, and the number of FFs and the order of FFs, Y, Cb, and Cr may be changed. In addition, "FFD9" that indicates an end of the image may be inserted at an error point, and the specific data may be embedded after the error point.

In addition, in the first embodiment, the image reproduction apparatus 100 need not include the monitor 190. In this case, the display processing unit 180 may cause a display apparatus such as an external display to display the compressed data stored in the storage unit 140. Note that the control unit 160, in this context, determines whether or not the decompressed data is to be output when the error management unit 150 detects an error (transfer error or coding error). When determining that the decompressed data is to be output, the control unit 160 performs image complementation, as in the first embodiment, using the complement image data. Then, the display processing unit 180 outputs the decompressed data including the complement image data.

In addition, in the second embodiment, the image recording apparatus 500 need not include the sensor 590. In this case, the image processing unit 580 may store, in the storage unit 740, the image data input from outside.

In addition, as described above, the present invention may be realized not only as an image reproduction apparatus and an image reproduction method but also as a program for causing a computer to execute the image reproduction method according to the present embodiment. In addition, the present invention may be realized as a computer-readable non-volatile recording medium such as a compact disc-read only memory (CD-ROM) for recording the program. Furthermore, the present invention may be realized as information, data, or a signal representing the program. In addition, these program, information, data, and signal may be distributed through the communication network such as the Internet.

In addition, according to the present invention, part or all of the constituent elements included in the image reproduction apparatus may be configured of one system large scale integration (LSI). The system LSI is a super-multifunctional LSI in which a plurality of constituent elements are formed on a single chip, and is specifically a computer system including a microprocessor, a ROM, a RAM, and so on.

For example, in the image reproduction apparatus 100 shown in FIG. 1, the reproduction unit 110 and the data buffer management unit 120, the decompression unit 130, the error management unit 150, and the control unit 160 are configured into a single system LSI. Note that this is merely one example, and the present invention is not limited to this example.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image reproduction apparatus and the image reproduction method produce an advantageous effect of allowing flexible processing of the decompressed data that is obtained when an error occurs, and are applicable to a digital camera and so on.

What is claimed is:

1. An image reproduction apparatus which decompresses compressed data that is compressed image data and outputs the decompressed data, said image reproduction apparatus comprising:
    a reproduction unit configured to read, per unit of processing, the compressed data as unit compressed data from a recording medium, the unit of processing being predetermined;
    a decompression unit configured to decompress the unit compressed data read by said reproduction unit, so as to generate unit decompressed data that is image data in each unit of processing;
    an output unit configured to output decompressed data including the unit decompressed data generated by said decompression unit;
    an error management unit configured to detect, for each unit compressed data, an error caused in at least one of said reproduction unit and said decompression unit;
    a control unit configured to determine whether or not the decompressed data is to be output when the error is detected;
    an input unit configured to receive a first user instruction indicating whether or not the decompressed data is to be output when the error is detected; and
    a data buffer management unit including at least one buffer and configured to store, into said at least one buffer, the unit compressed data that is read by said reproduction unit, wherein:
    when said control unit determines that the decompressed data is to be output when the error is detected, said control unit is configured to complement, with complement image data that is predetermined, unit decompressed data corresponding to the unit compressed data in which the error is detected, and said output unit is configured to output the decompressed data including the complement image data,
    said control unit is configured to determine, according to the first user instruction, whether or not the decompressed data is to be output when the error is detected,
    said reproduction unit is configured to forward, to said data buffer management unit, the unit compressed data read from the recording medium,
    said decompression unit is configured to read the unit compressed data stored in said at least one buffer, and decompress the unit compressed data that is read, so as to generate the unit decompressed data,
    said error management unit includes:
        a transfer error management unit configured to detect a transfer error which occurs in transferring the unit compressed data from the recording medium to said data buffer management unit; and
        a coding error management unit configured to detect a coding error in the unit compressed data read from said at least one buffer by said decompression unit,
    said reproduction unit is configured to re-read same unit compressed data from the recording medium when said transfer error management unit detects the transfer error, the same unit compressed data being compressed data that is included in a same unit of processing as the unit compressed data in which the transfer error has been detected, when detecting the transfer error, said transfer error management unit is configured to count the number of transfer errors, compare the counted number with a predetermined threshold, and notify said control unit of a result of the comparison, said control unit is configured to cause, based on the result of the comparison, said reproduction unit to repeat re-reading of the same unit compressed data until the counted number exceeds the threshold, and said control unit is configured to complement, with the complement image data, unit decompressed data corresponding to the unit compressed data in which the error has been detected, in the case where it is determined that the compressed data is to be output when the error is detected and where the counted number exceeds the threshold or the coding error is detected by said coding error management unit.

2. The image reproduction apparatus according to claim 1, wherein:

said input unit is further configured to obtain a second user instruction indicating the threshold, and said control unit is configured to cause said reproduction unit to repeat the re-reading of the same unit compressed data until the counted number exceeds the threshold indicated by the second user instruction.

3. An image reproduction apparatus which decompresses compressed data that is compressed image data and outputs the decompressed data, said image reproduction apparatus comprising:

a reproduction unit configured to read, per unit of processing, the compressed data as unit compressed data from a recording medium, the unit of processing being predetermined;

a decompression unit configured to decompress the unit compressed data read by said reproduction unit, so as to generate unit decompressed data that is image data in each unit of processing;

an output unit configured to output decompressed data including the unit decompressed data generated by said decompression unit;

an error management unit configured to detect, for each unit compressed data, an error caused in at least one of said reproduction unit and said decompression unit;

a control unit configured to determine whether or not the decompressed data is to be output when the error is detected;

an input unit configured to receive a first user instruction indicating whether or not the decompressed data is to be output when the error is detected; and a data buffer management unit including at least one buffer and configured to store, into said at least one buffer, the unit compressed data that is read by said reproduction unit, wherein:

when said control unit determines that the decompressed data is to be output when the error is detected, said control unit is configured to complement, with complement image data that is predetermined, unit decompressed data corresponding to the unit compressed data in which the error is detected, and said output unit is configured to output the decompressed data including the complement image data, said control unit is configured to determine, according to the first user instruction, whether or not the decompressed data is to be output when the error is detected, said reproduction unit is configured to forward, to said data buffer management unit, the unit compressed data read from the recording medium, said decompression unit is configured to read the unit compressed data stored in said at least one buffer, and decompress the unit compressed data that is read, so as to generate the unit decompressed data, said error management unit includes:
　a transfer error management unit configured to detect a transfer error which occurs in transferring the unit compressed data from the recording medium to said data buffer management unit; and
　a coding error management unit configured to detect a coding error in the unit compressed data read from said at least one buffer by said decompression unit, said reproduction unit is configured to re-read same unit compressed data from the recording medium when said transfer error management unit detects the transfer error, the same unit compressed data being compressed data that is included in a same unit of processing as the unit compressed data in which the transfer error has been detected, and said reproduction unit is configured to read the unit compressed data from the recording medium through access to the recording medium at a first access frequency, and to read the same unit compressed data, when said transfer error management unit detects the transfer error in the unit compressed data, through access to the recording medium at a second access frequency that is lower than the first access frequency.

4. An image reproduction apparatus which decompresses compressed data that is compressed image data and outputs the decompressed data, said image reproduction apparatus comprising:

a reproduction unit configured to read, per unit of processing, the compressed data as unit compressed data from a recording medium, the unit of processing being predetermined;

a decompression unit configured to decompress the unit compressed data read by said reproduction unit, so as to generate unit decompressed data that is image data in each unit of processing;

an output unit configured to output decompressed data including the unit decompressed data generated by said decompression unit;

an error management unit configured to detect, for each unit compressed data, an error caused in at least one of said reproduction unit and said decompression unit; and a control unit configured to determine whether or not the decompressed data is to be output when the error is detected, wherein:

when said control unit determines that the decompressed data is to be output when the error is detected, said control unit is configured to complement, with complement image data that is predetermined, unit decompressed data corresponding to the unit compressed data in which the error is detected, and said output unit is configured to output the decompressed data including the complement image data, and said control unit is configured to generate defective-recording-medium image data which indicates that the recording medium has a defect, in the case where errors occur in at least two pieces of unit compressed data included in the compressed data representing one frame or where an error occurs in compressed data indicating at least two frames, and said output unit is configured to output the defective-recording-medium image data.

* * * * *